United States Patent
Higaki et al.

(10) Patent No.: US 7,376,250 B2
(45) Date of Patent: May 20, 2008

(54) APPARATUS, METHOD AND PROGRAM FOR MOVING OBJECT DETECTION

(75) Inventors: Nobuo Higaki, Saitama (JP); Takamichi Shimada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 591 days.

(21) Appl. No.: 11/015,796

(22) Filed: Dec. 20, 2004

(65) Prior Publication Data
US 2005/0147277 A1 Jul. 7, 2005

(30) Foreign Application Priority Data
Jan. 5, 2004 (JP) ............................. 2004-000569
Jan. 5, 2004 (JP) ............................. 2004-000617

(51) Int. Cl.
*G06K 9/00* (2006.01)

(52) U.S. Cl. ...................... 382/107; 382/168; 382/181; 348/154; 356/27

(58) Field of Classification Search ................ 382/100, 382/103, 107, 106, 168–172; 348/154, 155; 356/27
See application file for complete search history.

(56) References Cited

U.S. PATENT DOCUMENTS

| | | | | |
|---|---|---|---|---|
| 5,892,855 A | * | 4/1999 | Kakinami et al. | 382/291 |
| 5,912,980 A | * | 6/1999 | Hunke | 382/103 |
| 5,991,428 A | * | 11/1999 | Taniguchi | 382/107 |
| 6,049,619 A | * | 4/2000 | Anandan et al. | 382/107 |
| 6,690,451 B1 | * | 2/2004 | Schubert | 356/3.14 |
| 6,763,125 B2 | * | 7/2004 | Ohta | 382/104 |
| 7,146,023 B2 | * | 12/2006 | Kondo et al. | 382/107 |
| 7,251,346 B2 | * | 7/2007 | Higaki et al. | 382/106 |
| 2002/0159616 A1 | * | 10/2002 | Ohta | 382/104 |
| 2004/0190752 A1 | * | 9/2004 | Higaki et al. | 382/103 |
| 2005/0180602 A1 | * | 8/2005 | Yang et al. | 382/103 |

FOREIGN PATENT DOCUMENTS

| | | |
|---|---|---|
| JP | 08-329254 | 12/1996 |
| JP | 2004-171189 | 6/2004 |

* cited by examiner

*Primary Examiner*—Bhavesh M. Mehta
*Assistant Examiner*—Anand Bhatnagar
(74) *Attorney, Agent, or Firm*—Squire, Sanders & Dempsey LLP

(57) ABSTRACT

The present invention detects a moving object by generating the distance information of the moving object, detecting the object motion, determining the object distance, detecting the object image area and the object contour from the video image that includes the object image and contour, and provides a moving object detection apparatus to carry out such detection as well as detecting a contour of the specific moving object by detecting the center of the moving object in high precision.

18 Claims, 22 Drawing Sheets

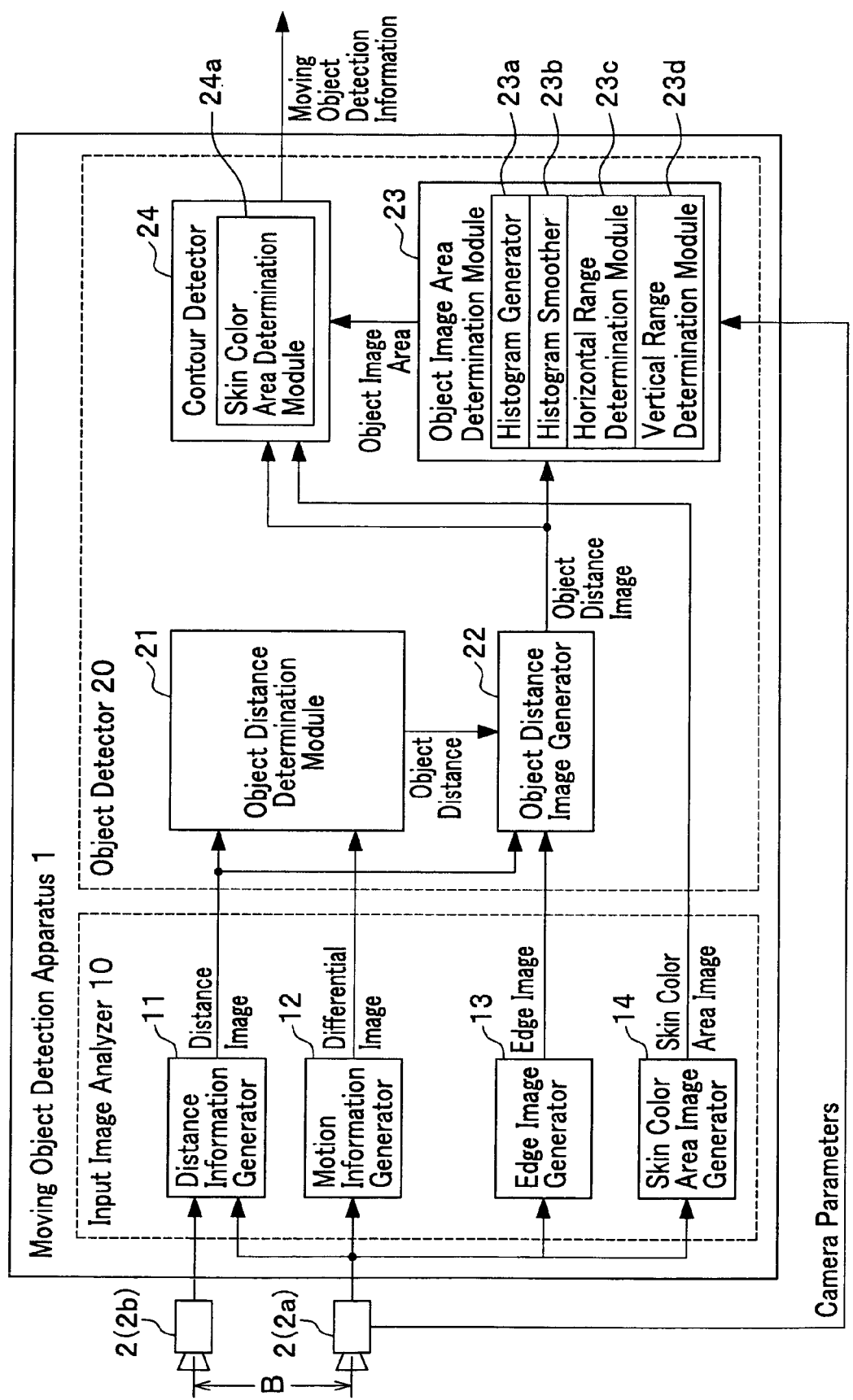

FIG. 4
(a)
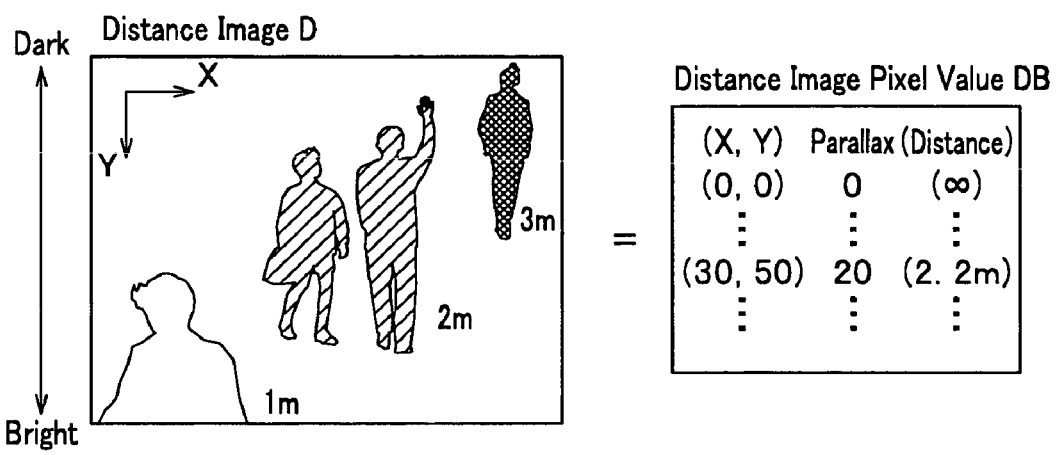
(b)
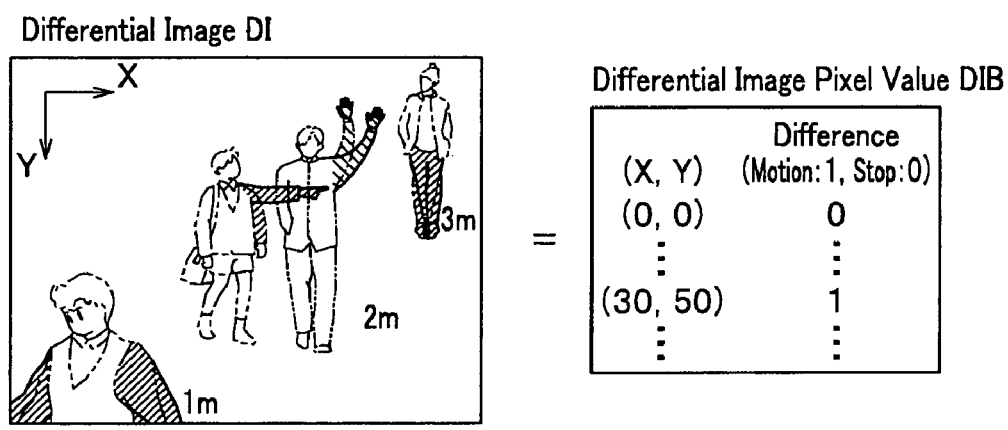

FIG. 5
(a) Relation between Parallax and Motion
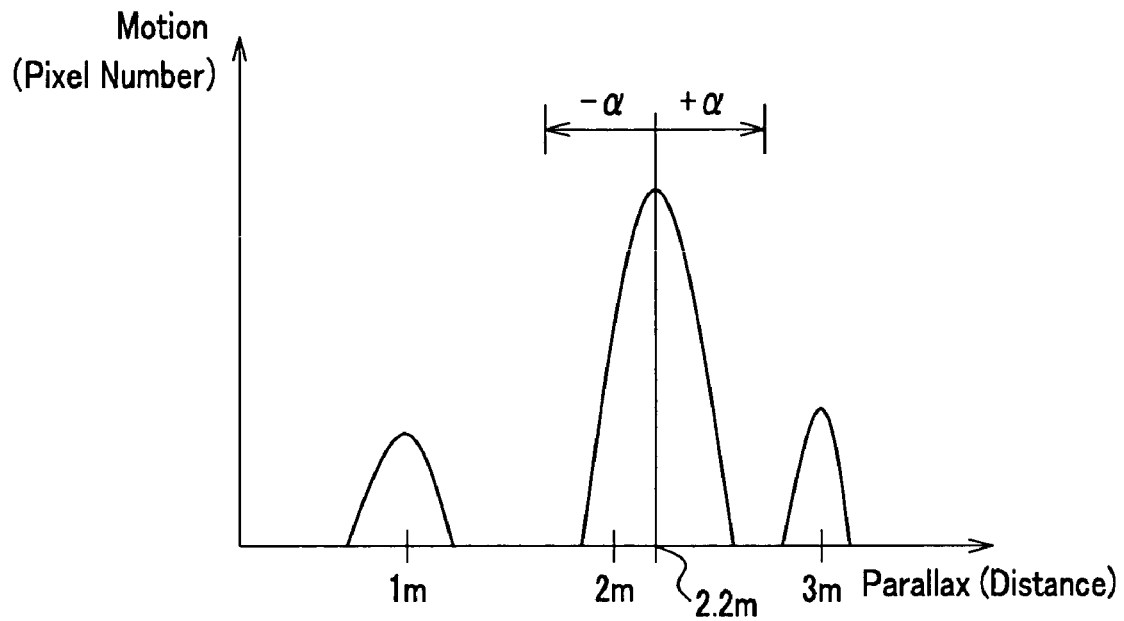
(b) Object Distance Determination
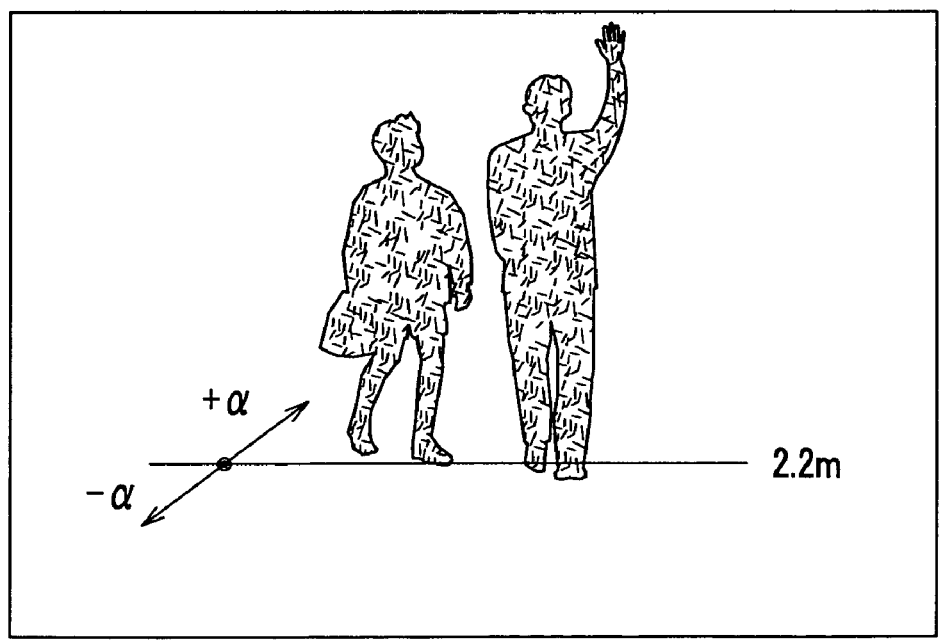

FIG. 8
(a) For tilt angle = 0°
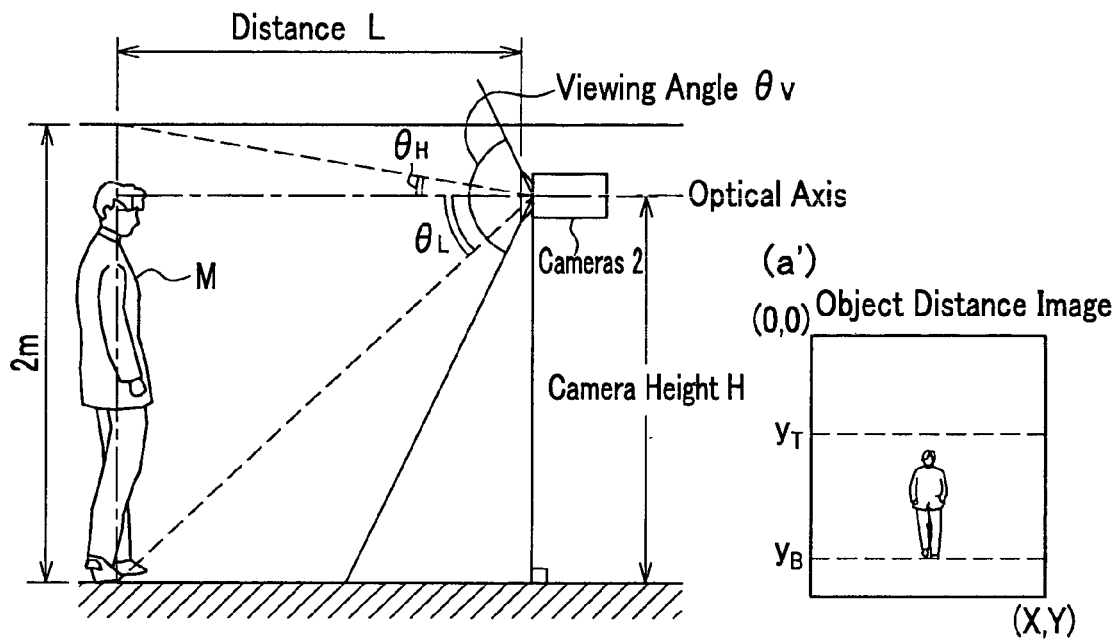
(b) For tilt angle ≠ 0°
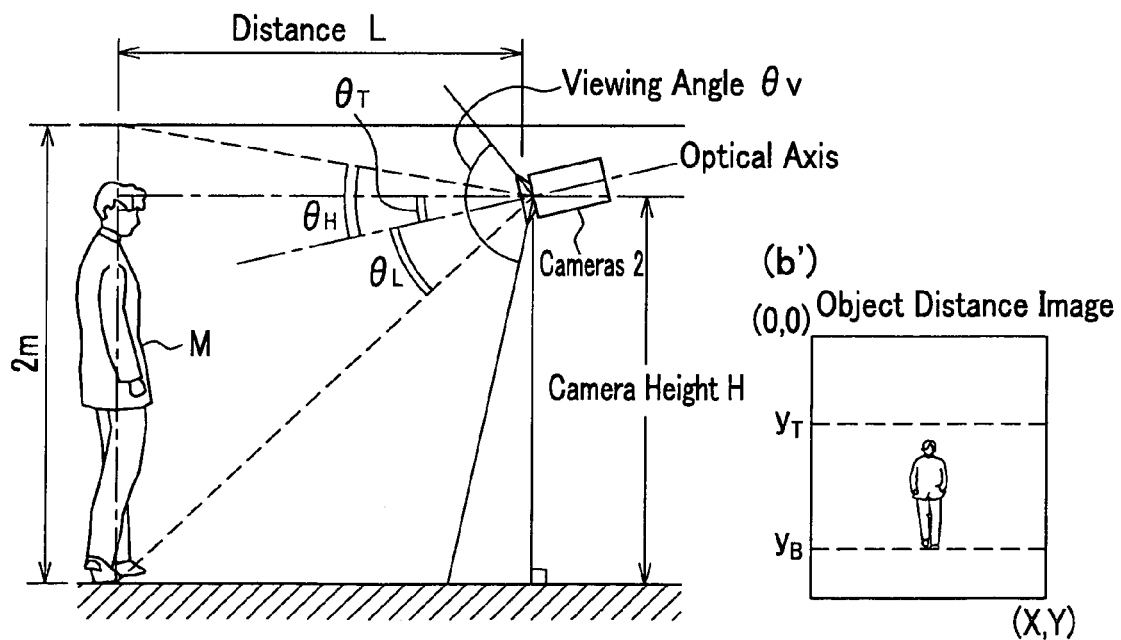

FIG. 9
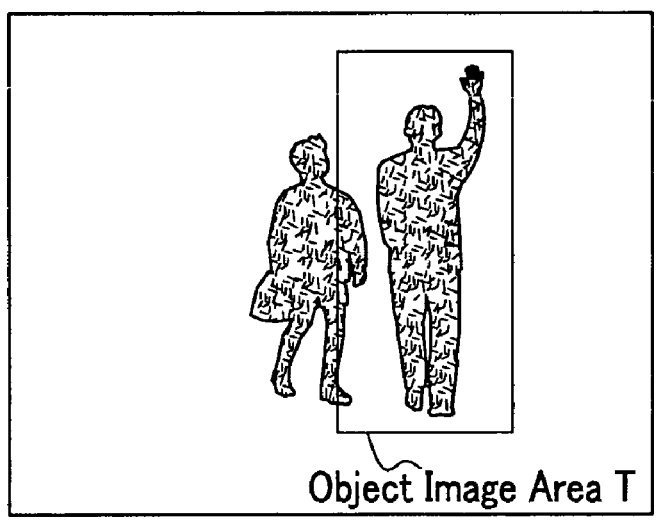
Object Distance Image TD
Object Image Area T
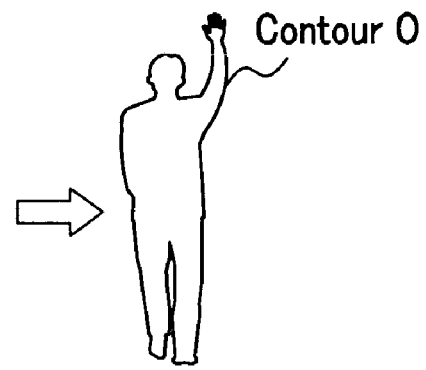
Contour O

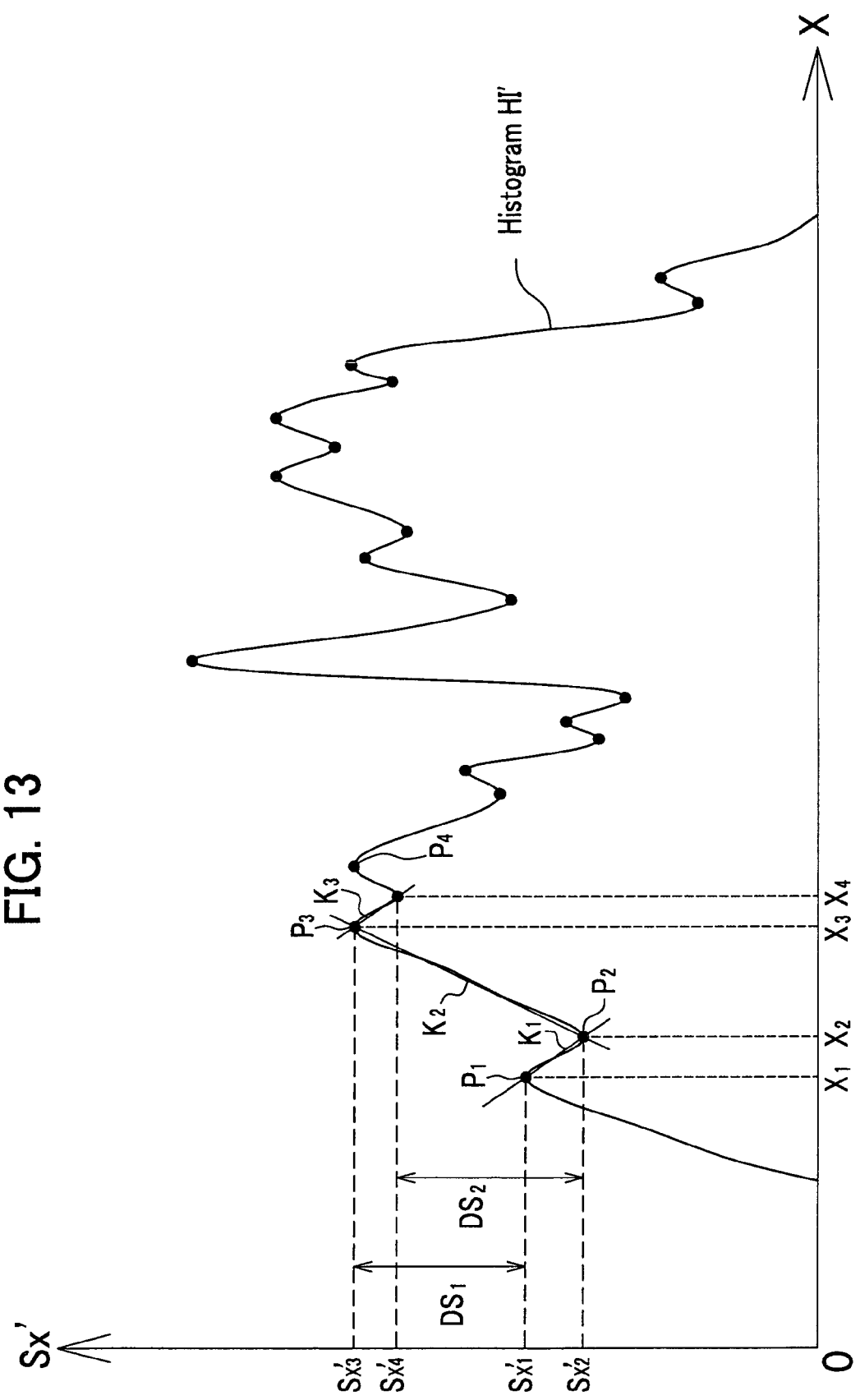

FIG. 17
(a) Object Image Area Determination
Object Distance Image TDE
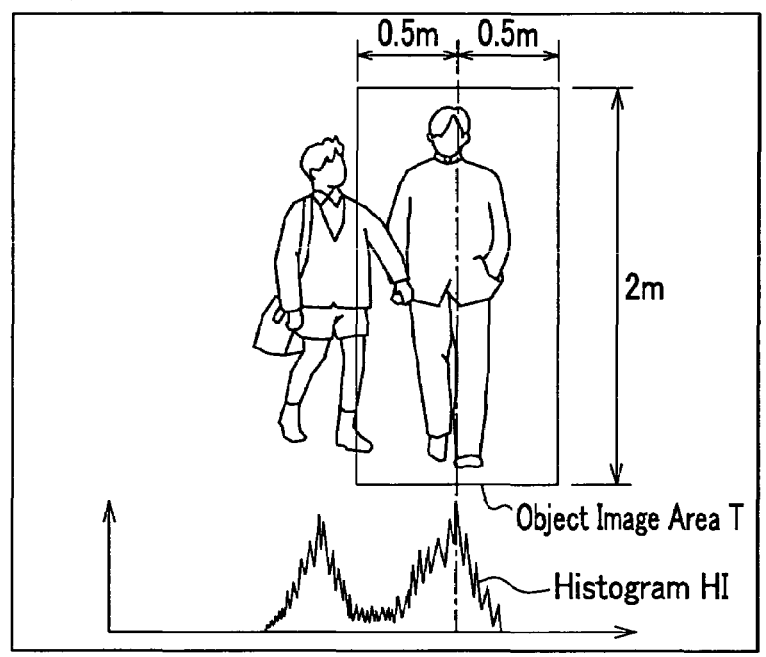
(b) Object Image Area Determination
Object Distance Image TDE
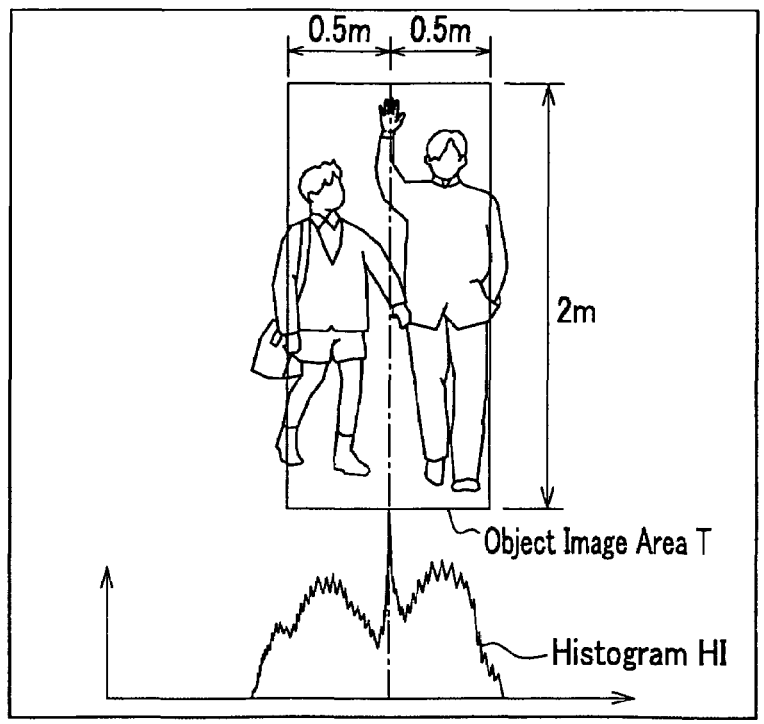

APPARATUS, METHOD AND PROGRAM FOR MOVING OBJECT DETECTION

FIELD OF THE INVENTION

The present invention relates to an apparatus, a method and a program for moving object detection, more specifically, to an apparatus, a method and a program for detecting moving objects such as humans and robots by using images (namely, video images) taken by plural digital video cameras.

As the technologies for detecting objects by using the video images taken by CCD video cameras, a dynamic contour model (called SNAKES), for example, that is to detect the contour of the object which is initially vague in the images, is a well known technology. The object detection technology on the basis of the contour detection is to detect the moving body by using the time-series images where a contour model is linked to the edges of the moving objects (see reference 1).

The technology described in the reference 1 has a problem such that plural objects are recognized as a single body when the plural objects are neighboring each other.

For such a technical problem, the present inventor has disclosed a new method to individually detect each of moving objects which are touching and neighboring in an unpublished patent application. The invention proposes a method that facilitates to detect an individual moving object from plural moving objects by specifying an image in a predetermined width around the center which is set to the moving object by using a histogram of the counting number of edge pixels in the vertical direction of the image picture.

For example, it is possible to extract an individual object from plural bodies by setting the position as the center of moving object in the searching area wherein the total number of pixels that compose an object in the vertical direction is the maximum.

Reference 1:
p. 7, FIG. 7 and 10, Japanese Published Patent, H8-329254, A (1996)
Reference 2:
Japanese Published Patent, 2004-171189, A (2002)

BRIEF SUMMARY OF THE INVENTION

However, as shown in the object distance image TDE denoted with (b) in FIG. 17, the improved moving object detection method may have still a problem in detecting the center of the moving human who raises his hand such that the edge pixels localize in the hand and the center of the moving object is determined to be the center in stead of the center of the moving human.

The present invention provides the apparatus, method and the program that can properly detect an individual object among plural objects without the influence of localizing noises in the histogram of the edge pixel numbers.

In order to solve the problem previously mentioned, the present invention such as the moving object detection apparatus that detects moving objects by means of plural video images, including image acquisition objects, taken by plural synchronized cameras, comprises; a distance information generating means that generates distance information regarding distance to the image acquisition objects on a basis of parallax of the cameras, a motion information generating means that generates motion information regarding motion of the moving objects on a basis of differences between video images input in time-series by one of the cameras, an object distance determining means that determines object distance which specifies a location where the moving object locates, an object distance image generating means that generates object distance image composed with pixels which correspond to the object distance determined by the object distance determining means, an object image area determining means that determines an object image area, included in the object distance image, corresponding to at least the object distance, and a contour detecting means that detects the moving object by detecting contour in the object image area determined by the object image area determining means, wherein the object image area determining means determines a histogram by counting the pixels in vertical direction for every horizontal coordinate points thereof, makes a smoothed histogram by smoothing the histogram in the horizontal coordinate and determines an object image area by using the smoothed histogram thereafter.

According to this moving apparatus, it is possible to precisely set the horizontal position of the moving objects and precisely extract the moving object because the local peak in the histogram is eliminated by the smoothing process.

The objective distance may be a specific one or a range of distances such as 1.0 to 1.2 meters.

The moving object detection apparatus 1 has further an edge image generator 13 that extracts the edge images from the video images. The object distance measurement module may generate an object distance image by selecting the pixels among those corresponding to the object distance obtained by the object distance measurement module.

It is possible to more precisely specify the moving object by making a histogram from the object edge image.

An object distance image generator generates the object distance images by selecting the pixels corresponding to the object distance which is specified by the object distance measurement module.

The smoothing of pixel numbers in the object image area detection module is carried out over the coordinate x in the object area by the following computation as;

$$S'_x = \sum_{n=x-x_0}^{x-1} \frac{S_n}{f(n)} + S_x + \sum_{n=x+1}^{x+x_0} \frac{S_n}{f(n)} \quad (1)$$

where, $S_x$ is the pixel number of the coordinate x of the histogram, $S_x'$ the pixel number at the coordinate x after smoothing, $x_0$ the positive constant number and $f(n)$ a function of n or constant.

By adding the pixel numbers of the pixels neighboring to the pixel number $S_x$ at the coordinate x of the histogram, it is possible to smooth the histogram. For example, $f(n)=|x-n|$ can be set in the equation (1).

The smoothing in the object image area detection module can have the following relation further to eq. (1).

$$S'_x = 0 \left( \text{for } \sum_{n=x-x_0}^{x-1} S_n = 0 \text{ or } \sum_{n=x+1}^{x+x_0} S_n = 0 \right) \quad (2)$$

For the smoothing only by the equation (1), the foot area of the histogram expands along the vertical position at "foot areas" where the pixel number of the histogram is close to zero. Therefore, there is a risk in extracting moving objects in a condition such that plural moving objects exist in the same distance and are close to each other. However, it is possible to suppress the foot areas and to detect a specific moving object among other objects.

In the above moving object detection apparatus, the object image area detection module specifies a predetermined horizontal area around the point where the pixel number is the maximum number. The object image area detection module can specify the vertical area of the object image area in a basis of the tilt angle and the height from the floor where the moving object detection apparatus is set.

The object image area detection module evaluates symmetry of the smoothed histogram and determines the object image area on a basis of most symmetry point in the smoothed histogram.

By using this system construction, it is possible to determine the object image area on a basis of most symmetry point in the smoothed histogram even the peak of the histogram does not coincide with the center of the moving object because the object image area determines the object image area by using the point that shows the most symmetry of the smoothed histogram.

Especially, for the case when the moving object is human, the histogram tends to have symmetry shape since the human body is substantially symmetric. Therefore, once the human raise his hand and the peak of the histogram shift from the substantial center of the human, it is possible to determine the object image around the center of the moving object in high precision.

It makes easier to determine the symmetry of the histogram by smoothing the histogram and detect the center position in high precision. The smoothing reduces the local maxima and the local minima and resultantly reduces the computation load.

The object distance determining generator counts such pixels that show motion for every range of distances and preferably determines object distance where the moving object locates on a basis of count of the pixels thereafter.

According to the system construction, the object distance determination module sets the parallaxes (distances) as the object distance by counting the quantities of the pixels (in other words making a histogram) for every range of parallaxes in the differential images DI, where the pixels which present the motions are counted up and judging the maximum count value among the ranges of parallaxes implies the presence of the most motive moving object in such range of parallaxes. By applying such a simple method such as counting the pixels, it is possible to specify the object and the set the distance so that a high throughput of processes is obtained.

The object distance image generator generates an object distance image composed with pixels that present said image acquisition objects existing in a predetermined range in depth direction on the basis of the object distance.

According to such system construction, the moving object detection apparatus detects only the pixels in the previously determined area (called a predetermined area) by means of the object distance image generator. It is possible to generate the object distance image that specifies the moving objects existing in the object distance among the objects which are moving in the same direction.

The object detection apparatus detects the local maxima and the minima in the histogram, determines the pixel number difference in the vertical direction of every three series points and inclination difference of two lines provided by a center point and other two points of the three series points and preferably determines a center point of three series points of which center point provides a minimum pixel number difference and a minimum inclination difference as most symmetry point in the smoothed histogram.

According to such system construction, the object detection apparatus detects local maxima and minima in the histogram, determines pixel number difference in vertical direction of every three series points and inclination difference of two lines provided by a center point and other two points of the three series points and then determines and judges a center point of three series points which has a minimum pixel number difference and a minimum inclination difference as most symmetry point in the smoothed histogram. Therefore it is possible to define the symmetry parameter by the difference pixel number difference and the difference of two inclinations and judge the most symmetry point.

The moving object detection apparatus preferably determines the horizontal range of the object image area with a particular margin around the horizontal points of the local maximum point and the local minimum point which are judged as the most symmetry point.

According to such system construction, the moving object detection apparatus sets a predetermined arrange of the horizontal points of the local maximum and the local minimum which have determined as the most symmetry points and judged as the horizontal range of the object image area. It is possible to appropriately determine the horizontal range of the object image area which is set in the distance image.

In order to solve the problems as previously described, the moving object detection method that detects moving objects by means of plural video images, including image acquisition objects, taken by plural synchronized cameras, comprises the following steps of; generating distance information regarding distance to the image acquisition objects on a basis of parallax of the cameras, generating motion information regarding motion of the moving objects on a basis of differences between video images input in time-series by one of the cameras, determining object distance which specifies a location where the moving object locates, generating object distance image composed with pixels which correspond to the object distance determined by the step of determining the object distance, determining an image area, included in the object distance image, corresponding to at least the object distance and detecting the moving object by detecting contour in the object image area determined by the step of determining the image, wherein the step of determining the image area further functions to determine histogram by counting the pixels in vertical direction for every horizontal coordinate points thereof, make a smoothed histogram by smoothing the histogram in the horizontal coordinate and determine an object image area by using the smoothed histogram thereafter.

The step determining object image area preferably determines the object image area on the basis of the most symmetry point in the smoothed histogram by evaluating the symmetry of the smoothed histogram.

In order to solve the problem previously described, the moving object detection program that has a function to detect moving objects by means of plural video images, including image acquisition objects, taken by plural synchronized cameras, comprises; a distance information generating subprogram that generates distance information regarding distance to said image acquisition objects on a basis of parallax of said cameras, a motion information generating subprogram that generates motion information regarding motion of said moving objects on a basis of differences between video images input in time-series by one of said cameras, an object distance determining subprogram that determines object distance which specifies a location where said moving object locates, an object distance image generating subprogram that generates object distance image composed with pixels which correspond to said object distance determined by said object distance determining subprogram, an object image area determining subprogram that determines an object image area, included in said object distance image, corresponding to at least said object distance, and a contour detecting subprogram that detects said moving object by detecting contour in said object image area determined by said object image area determining subprogram, wherein said object image area determining subprogram determines a histogram by counting said pixels in vertical direction for every horizontal coordinate points thereof, makes a smoothed histogram by smoothing said histogram in said horizontal coordinate and determines an object image area by using said smoothed histogram thereafter.

The object image area determining subprogram preferably determines the object image area on the basis of the most symmetry point in the smoothed histogram by evaluating the symmetry of the smoothed histogram.

BRIEF DESCRIPTION OF THE DRAWINGS

FIG. 1 is a block diagram that shows the whole structure of the functional modules installed in the moving object detection apparatus of the first embodiment.

FIG. 4 is an example of the contents of the distance image and the difference image.

FIG. 5 is an explanatory schematic that shows the procedure to generate the object distance image on the basis of the motion (pixel number) for each parallax (distance).

FIG. 8 is an explanatory schematic that shows the procedure to compute the height level of the moving object in the object distance image.

FIG. 9 is a schematic that shows an example to detect the contour of the object image area in the object distance image.

FIG. 13 is a schematic that shows the local maxima and minima in the histogram.

FIG. 17 is a schematic that shows an example of object distance image and the object image area obtained by the conventional moving object detection apparatus.

DETAILED DESCRIPTION OF THE INVENTION

Figure 2A:
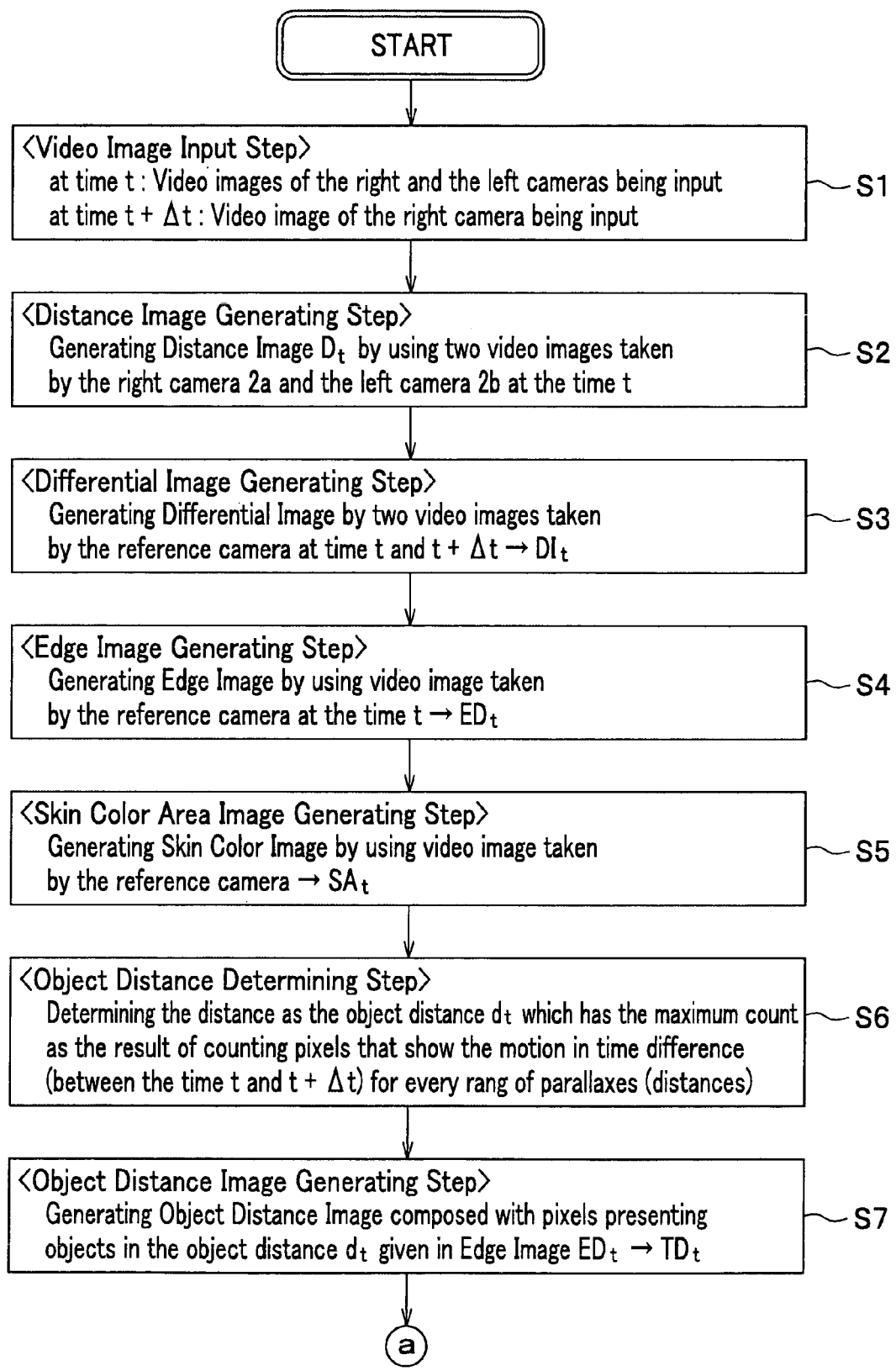
FIG. 2A is a part (the first one of all three parts) of the flow chart that shows the operation of the moving object detection apparatus of the first embodiment.

The moving object detection apparatus according to the present invention, the detection method of the moving object and the computer program of the moving object detection can remove the localized peak number in the histogram and therefore it is possible to specify and detect the moving objects.

We discuss the embodiments of the present invention as follows with reference to the figures.

First Embodiment

A first embodiment of the present invention is explained in referring to the figures and equations in the following sections.

(Structure of a Moving Object Detector)

FIG. 1 shows the whole structure of the moving object detection apparatus 1. The fundamental function of the moving object detection apparatus 1 is to detect the object which is in a motion (we call "moving object"). In this embodiment, the moving object detection apparatus 1 is constructed with an input image analyzer 10 which analyzes the input video images and an object detector 20 which detects the object from the analyzed video images. Two cameras 2 composing the camera 2a and the camera 2b are horizontally set in a separation length B. One is called a right camera 2a set in relatively right position and the other a left camera 2b set in the relatively left position.

The input image analyzer 10 analyzes the video images taken by the two cameras 2 and synchronously input to the input image analyzer 10. As the result of the image analysis, distance images which include the distance information, differential images which include the motion information, edge images which are the edges extracted from the video images. The input image analyzer 10 is constructed by the distance information generator 11, the motion information generator 12, edge image generator 13 and the skin color area image generator 14.

The distance information generator 11 generates the distance image embedded with the distance information which is the distance of the objects obtained by the parallax of the two cameras 2 (more precisely the distance of the objects from the focuses of the two cameras 2). The distance information generator 11 receives the video images taken by the cameras 2 for every 100 ms a frame.

The parallax computation is carried out by using the reference image picture. The reference image picture is concurrently taken by the right camera 2a and left camera 2b and a block matching is carried out so that a specific block of which size is (for example, 8×3 pixels) is used to determine the parallax against the reference image picture. The distance image is made by the magnitude of the parallax corresponded to each pixel on the reference image picture.

We assume the parallax as Z, the distance to the object from the cameras 2, the focal lengths f of the cameras 2 (not shown in the figures) and the separation distance B between two cameras 2. Then these parameters are related in $$L = B \times f / Z \quad (3)$$

where, L is the separation distance of the object vertical to the line determined by two cameras 2.

The motion information generator 12 generates a differential image to which the motion information of the objects is embedded. The differential image is generated by the subtraction of two picture images which have been taken in time-series by the reference camera (the right camera 2a in the embodiment).

The motion information generator 12 takes a differentiation between two video images taken by two different instances using the right camera 2a as the reference camera. For example, the differentiation is carried out between a video image and another one taken in Δt (for example, 33 ms) later, for example, in the case of 100 ms frame rate.

The differential image is generated in the way such that a pixel value "1" is set for the pixel which keeps the infinite difference and "0" for the pixel which keeps the zero difference. The differential image is processed by filters such as median filters and the noises are removed from the differential image.

In the case when the cameras 2 are installed in robots or automobiles, the back ground scenes are changing. The motion of the cameras such as pans or tilts is input to the motion information generator 12 and correction is done for the video image at the time of t+Δt. The differentiation with the video image at the time t can generate the differential image and the pixels associated with the motion can be specified.

The edge image generator 13 receives the video image (a reference image picture) generates an edge image in which the edges of the images are extracted. The edge image generator 13 specifies edges as the portions where the brightness (intensity and grey scale) of images largely changes and generates the edge image which is composed of the edges. For example, products for all of the pixels are made with an operator which has a weighting coefficient against the neighboring pixels for a certain pixel (such as a coefficient matrix, Sovel operator, Kirsch operator, etc.) and then the edges are detected.

The skin color area image generator 14 receives the video image (reference image picture) from the cameras 2 (2a). The skin color area image generator 14 converts RGB values into an HLS space of which elements are the hue, the brightness and the color saturation and specifies the sink color area as the areas given by all of the pixels which are above the threshold values predetermined for the hue, the brightness and the color saturation.

Figure 3:
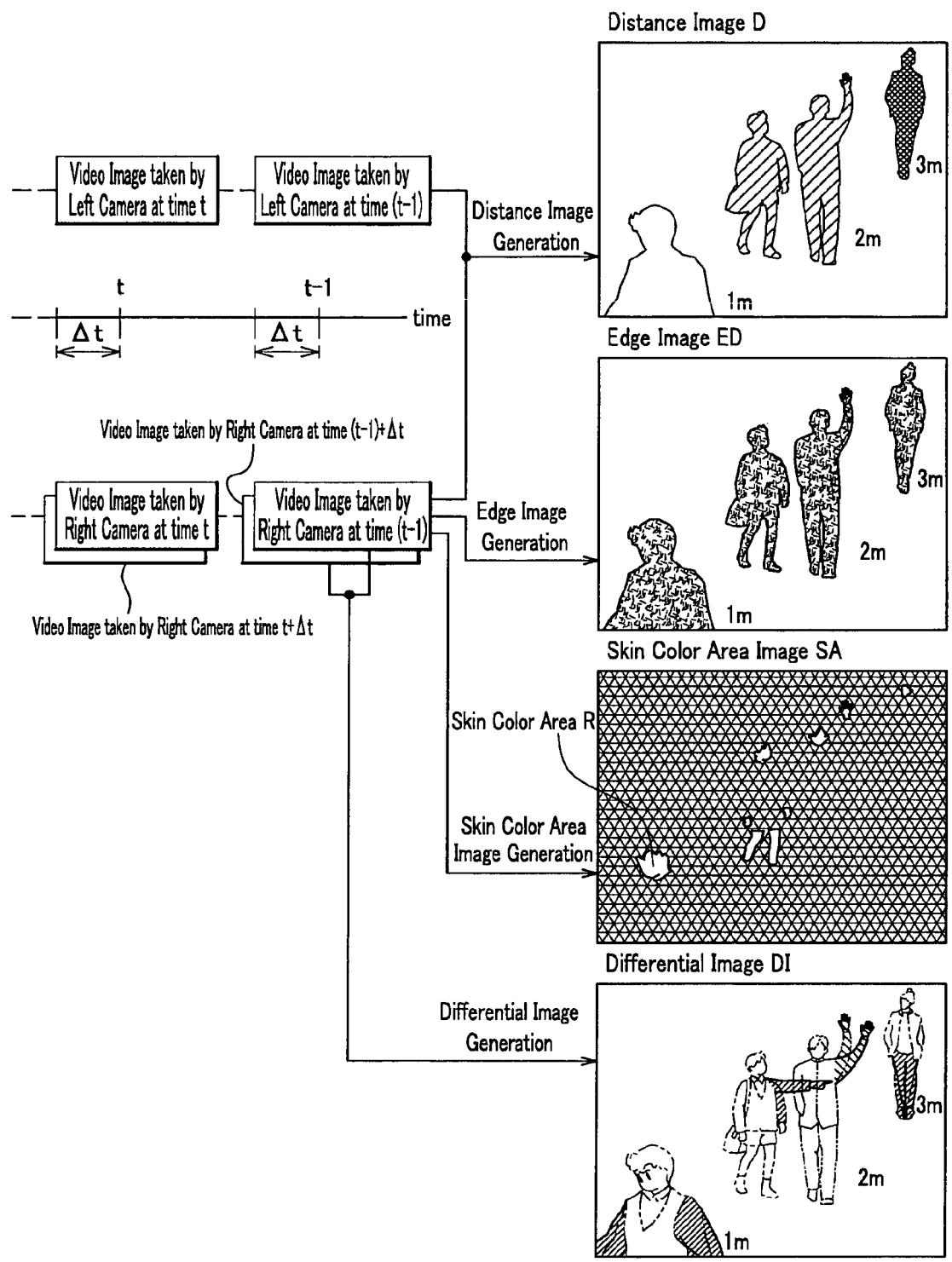
FIG. 3 is an example of the contents of the distance image, the edge image, the skin color area image and the difference image.

We will discuss the details of the generation processes of the in distance image, the differential image, the edge image and the skin color area image. FIG. 3 shows the sequence to generate these images after video image input to the input image analyzer 10.

As shown in FIG. 3, the distance image D is generated by setting pixel values on the pixels wherein the pixel values are given by the parallaxes which are obtained by two images concurrently taken by the right camera 2a and the left camera 2b. It implies that the larger the parallax, the closer the object (a human for the picture in FIG. 3) to the camera and vice versa. The edge image ED is based on the video image taken by the right camera 2a and including only the edges specified by the edge image generator 13. The skin color area image SA is based on the video image taken by the right camera 2a like as the edge image ED and is generated by extracting the areas (skin color area) where skin color is detected. The differential image DI is generated by setting "1" and "0" as the pixel value for all pixels which show differences and no differences, respectively, in the differential image of two video images taken by the right camera 2a with the time difference Δt (for example, a video image taken at time t and another video image at time t+Δt). The difference of "1" shows the actual motion of humans.

The details of the distance image D and the differential image DI are discussed with reference to FIG. 4. The upper schematics in FIG. 4 show an example of the generated image and the pixel values (distance image pixel values DB). The lower schematics in FIG. 4 show an example of the generated image of the differential image DI and the pixel values (the differential image pixel values DIB). The object humans exit in about 1, 2 and 3 meters apart from the camera 2.

The distance image D, as shown in FIG. 4A, show the pixel values which correspond to the parallaxes obtained by the two concurrently taken video images by the right camera 2a and the left camera 2b. For example, as shown in the distance image pixel values DB, the pixel position (0, 0) in the distance pixel has zero parallax which implies the distance from the camera is infinity (∞). The pixel position (30, 50) has the pixel value as 30 and the distance of such pixel position from the camera 2 is the distance that corresponds to the distance, for example 2.2 meters. As explained above, the distance image shows the object bright when it is close to the cameras 2 and dark when it is far from the cameras 2.

The differential image DI as shown in FIG. 4B presents the presence of the differences of pixels between two time-series video images taken by the right camera 2a. For example, as shown in the differential image pixel values DIB, the pixel value at (0, 0) in the differential image DI is "0" which implies "being still" and no motion taken place. The pixel value at (30, 50) in the differential image DI is "1" which implies "have moved" and a motion taken place.

The object detector 20 as shown in FIG. 1 specifies and extracts the contours of moving objects through the processes that the image areas corresponding to the moving objects is specified by using the images output by the input image analyzer 10 (such as the distance images, differential images, edge images and the skin color area images). The object detector 20 is constructed with an object distance measurement module 21, an object distance image generator 22, an object image area detection module 23 and a contour detector 24.

The object distance determination module 21 determines the largest variance in motion by using the distance image D and the differential image DI (we may call "making an image product") and determines the object distance. The information of the object distance is sent to the object distance image generator 22.

The object distance determination module 21 counts the quantities of the pixels for every range of parallaxes (which correspond to the distance from the cameras 2) in the differential images DI, where the pixels which present the motions are counted up. The maximum count value among the ranges of parallaxes implies the presence of the most motive moving object in such range of parallaxes (we call this parallax as maximum-count parallax). For example, the count of the pixel values is 110 for a 1.0 to 1.1 meter range of parallaxes (therefore the range of the distance) and the count of the pixel values is 92 for a 1.1 to 1.2 meter range of parallaxes (therefore the range of the distance). The object distance determination module 21 makes these counts and determines the maximum-count parallax.

The depth (as plus $\alpha$ and minus $\alpha$ to the center value) of the object distance corresponding to the most frequent parallax distance range is set as the range of the distance where the most motive moving object exists. The value of $\alpha$ implies the range in the depth direction as the reference of the object distance. The value of $\alpha$ is set to be the difference between two distance images D, such as the distance image D taken at the time t−1 and that at the time t (it should be noted that the time t and t−1 are the discrete time), which are sent from the distance information generator 11 in time-series. It is also possible to set the value of $\alpha$ in a fixed value as several tens centimeters for the purpose of detecting humans.

The object distance determination module 21 records the distance image D generated by the distance information generator 11 and the differential image ID generated by the motion information generator 12 in storage devices (not shown in FIG. 1) as semiconductor memories, hard disc devices, etc.

The object distance image generator 22 generates the object distance images by combining the edge images generated by the edge image generator and the distance images generated by the distance information generator 11 on the basis of the distance image which has pixels of which values are presented by the parallaxes. As the result, the pixels correspond to the parallaxes and therefore the object distances which are determined and set by the object distance determination module 21.

The object that satisfies the most frequent parallax is calculated for the separation distance L from the cameras 2 by using eq. (3). The range of parallax range Zr can be given by eq. (4), where it is assumed that the focal length of cameras 2 is f where the separation distance B between the camera 2a and the camera 2b and the depth range $\alpha$ of the object are given.

$$B \times f / (L+\alpha) < Zr < B \times f / (L-\alpha) \quad (4)$$

The object distance image generator 22 generates an object distance image which is composed of the pixels that satisfy the range given by eq. (4) in the edge images.

The object distance image may be generated by selecting the pixels which are in the range of object distance in the picture of a video image (an original image) taken by a reference camera (which is the right camera 2a) or the distance image generated by the distance information generator 11.

Referring to FIG. 5 (as well as FIG. 1), the process to generate the object distance image which presents the distance from the position specifying the object to be detected is discussed in details. The upper schematic of FIG. 5 is a histogram that shows the motion (in a quantity of pixels) which is a count of pixels against each range of parallaxes (distances). The lower schematic in FIG. 5 shows the object distance image TD that is composed of the pixels which satisfy the range of the object distance in the edge image ED (FIG. 3).

The upper schematic of FIG. 5 shows the parallaxes (corresponding to the distances) in the distance image D (FIG. 4) against the motion (pixel quantities). The motion has the maximum at the parallax (distance) in 1 meter, 2.2 meters and 3 meters. the object distance determination module 21. It is assumed that the moving object exists at the parallax (2.2 m) where the motion quantity is the maximum and determined that the moving object exists in the range of depth ($\pm\alpha$). The value of $\alpha$ is set to be the difference between two distance images D, such as the distance image D taken at the time t−1 and that at the time t, which are sent from the distance information generator 11 in time-series. It is also possible to set the value of $\alpha$ as 0.5 so that the object human exists in the range from the cameras 2.

The object distance image generator 22, as shown in the lower schematic of FIG. 5, generates the object distance image TD which specifies only the humans who exist 2.2±$\alpha$ a meters apart from the cameras 2 in the picture of the edge image generated by the edge image generator 13 after removing the image of the humans who exist 1 meter and 2 meters apart from the cameras 2.

The object image area determination module 23 determines the horizontal range of object image area as the optimum width of humans under the assumption that the moving objects are is humans. In the cases when a human is approaching along the direction of the tilted angle against the front direction of the camera, the object image area determination module determines the horizontal range of the object after confining the horizontal range. The detection of human may be done in the width of the shoulder of the human.

The object image area determination module 23 includes a histogram generator 23a, a histogram smoother 23b, a horizontal range determination module 23c and a vertical range determination module 23d.

The object image area determination module 23 may determine the horizontal range to cover the allowable width of the human figure. When the human approaches to the cameras 2 in a deviated angle to the optical axis of the cameras 2, the object image area determination module 23 narrows the horizontal range because it may be possible to cover the human figure in such narrow range.

The object image area determination module 23 takes a height (for example 2 meters) of the object image area in vertical direction. For this case, the object image area determination module 23 determines the vertical area (range) of the object image area on the basis of the tilt angle, the height from the floor (installation plane) etc. of the cameras 2.

Figure 6:
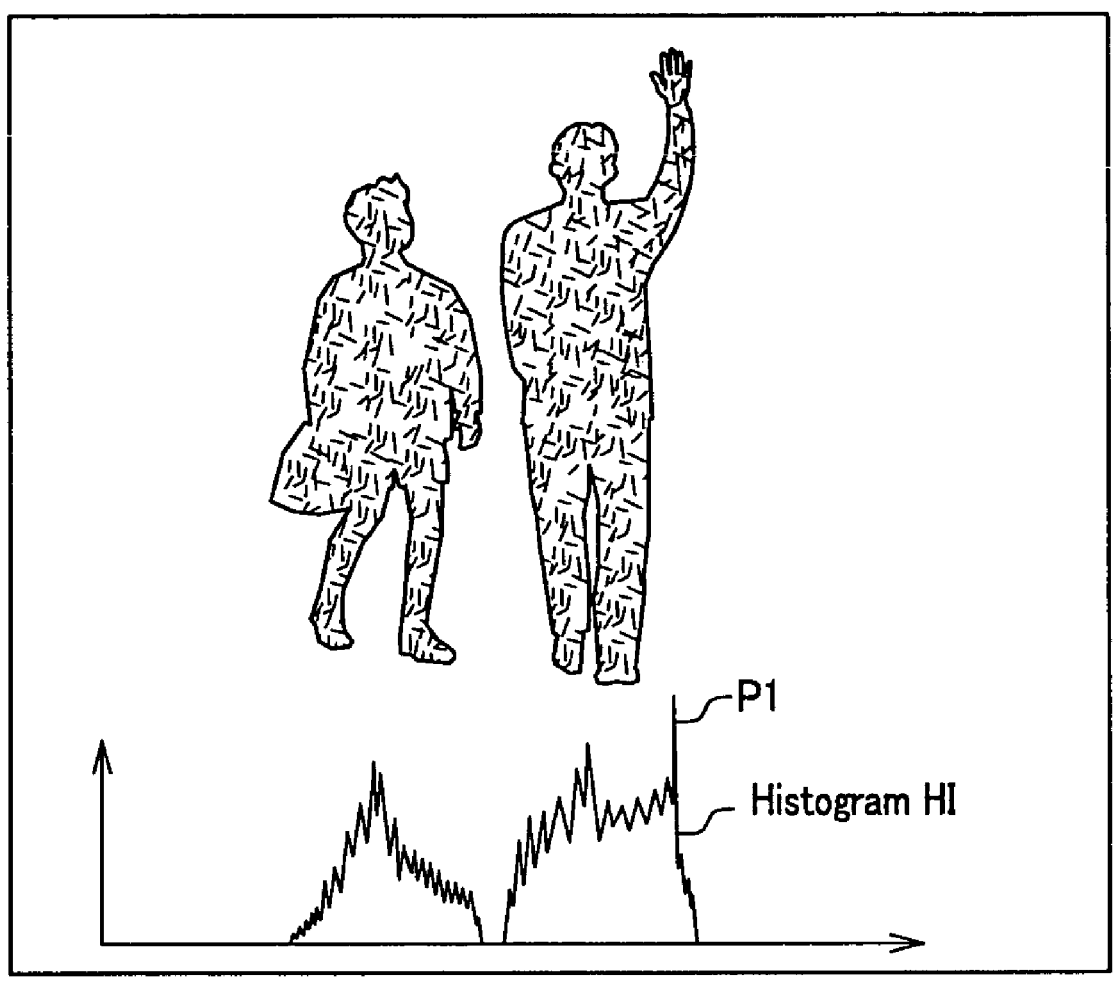
FIG. 6 is a histogram of the chart presenting the position where the count of the pixels in the vertical direction in the object distance image.

Referring to FIG. 6 and FIG. 7 (sometimes FIG. 1), a process is discussed in details that the object image area determination module 23 determines an area of the moving object image (of a human) in the object distance image TD. FIG. 6 is a histogram HI that presents the count of the pixel which is the count number of pixels in the vertical direction from the original pixel locating in a horizontally sweeping line in the object distance image. FIG. 6 shows the histogram HI together with the object distance image TD. But this is for just a convenience of the explanation.

Figure 7A:
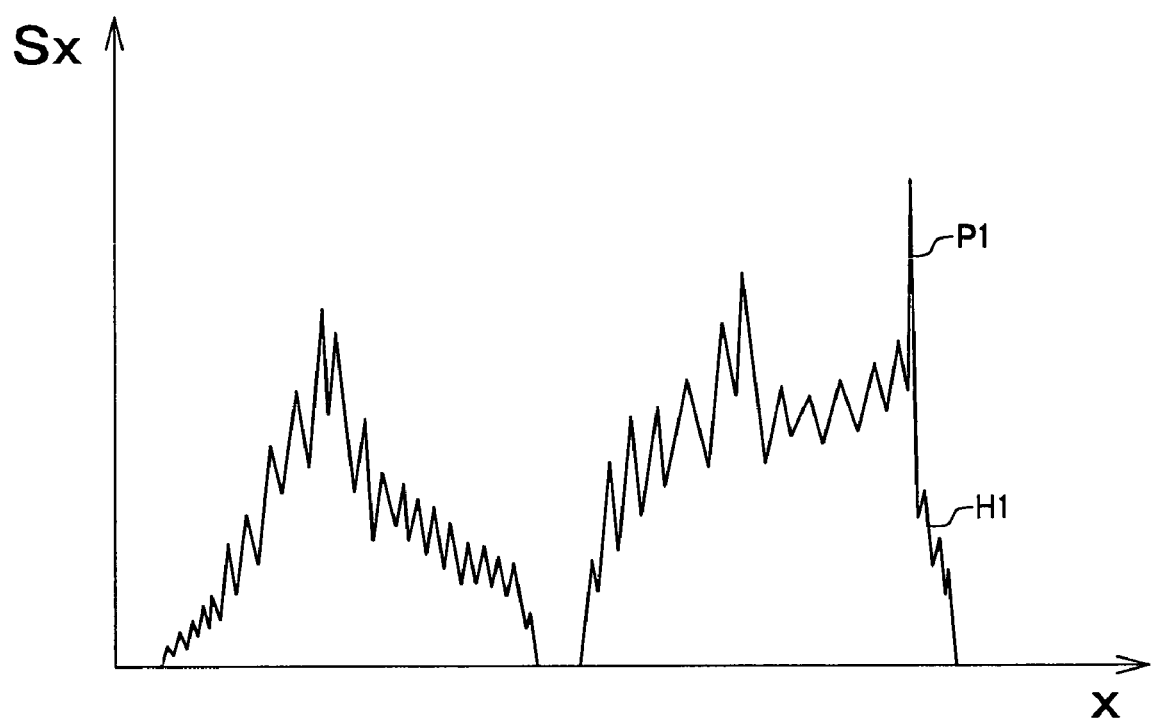
FIG. 7A is a schematic that shows an example of the histogram before smoothing the histogram.
Figure 7B:
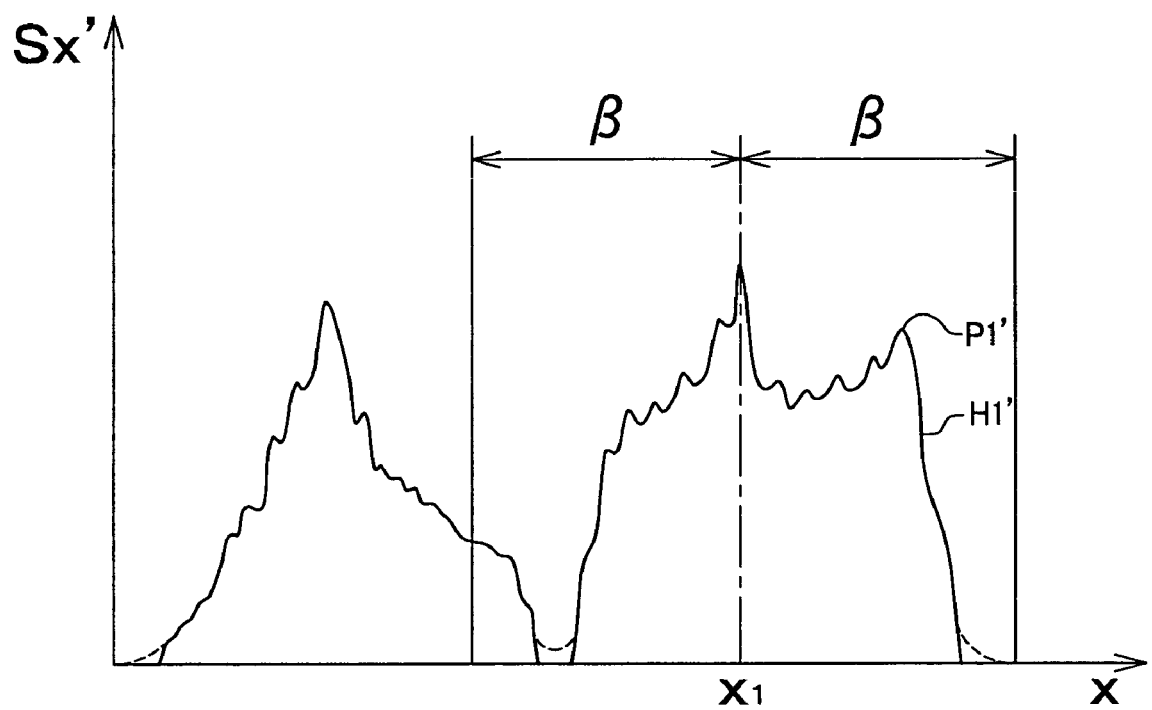
FIG. 7B is a schematic that shows an example of the histogram after smoothing the histogram.

FIG. 7A is a histogram HI before smoothing and FIG. 7B another histogram HI' after smoothing.

A histogram generator 23a generates a histogram HI that presents the pixel count which is the count of the pixels in a vertical direction in the object distance image TD.

A histogram smoother 23b carries out smoothing process along the pixel position the histogram HI which the histogram generator 23a generates.

More concretely, the smoothing is carried out by process (that is a moving average computation process) prescribed in the following algorithm.

$$S'_x = \sum_{n=x-x_0}^{x-1} \frac{S_n}{f(n)} + S_x + \sum_{n=x+1}^{x+x_0} \frac{S_n}{f(n)} \qquad (5)$$

where, $S_x$ is the pixel count at the x-coordinate in the histogram HI and $S_x'$ the pixel count at the x-coordinate in the histogram HI' and $x_0$ a positive constant. The function $f(n)$ is a function of n which is a pixel number given by an integer including null. The function $f(n)$ can be a constant number. By using eq. (6) where $F(n)=|x-n|$, the pixel quantity $S_n$ which is close to the coordinate value n number has larger weight than the others. Therefore, it is possible to generate the smoothed histogram HI' which still keeps the features of the histogram HI by using $$S'_x = \sum_{n=x-x_0}^{x-1} \frac{S_n}{|x-n|} + S_x + \sum_{n=x+1}^{x+x_0} \frac{S_n}{|x-n|} \qquad (6)$$

According to this smoothing process, the histogram HI as shown in FIG. 7A can be converted into the histogram HI' as shown in FIG. 7B. A localized peak P1 in the histogram HI is suppressed into a lower peak P1'.

It is preferred to use an additional condition given by eq. (7) for the purpose not to make a dull foot area of the histogram curves as, $$S'_x = 0 \left( \text{for } \sum_{n=x-x_0}^{x-1} S_n = 0 \text{ or } \sum_{n=x+1}^{x+x_0} S_n = 0 \right). \qquad (7)$$

In the case when the pixel count $S_x$ of the histogram HI is zeros at the right neighboring position (at a larger x) and the left neighboring position (at a smaller x) to a concerned position x in the x-coordinate, the resultant pixel count $S_x'$ in the smoothed histogram is set for either case.

In other words, the foot portions of the smoothed curves do not expand and keep sharpness with being different from the dotted lines as shown in FIG. 7B. By keeping the sharpness, it is avoided that the neighboring two persons are merged in the histogram HI.

The horizontal range determination module 23c determines the horizontal range which the contour detector 24 carries out the contour determination process for the purpose of specifying a single moving object in the histogram HI' which has been smoothed in the histogram smoother 23b.

More specifically, the horizontal range of an object is determined such that the x-coordinate where the pixel quantity $S_x'$ is the maximum is regarded as the center of the moving object and the horizontal range includes the neighboring range (β in FIG. 7B) to the center of the moving object. The parameter β may be selected in a value and the horizontal range covers the width of a human or larger so that it is possible to cover the figure of a human who raises his hand and/or his arm. In the next phase, the horizontal (the coordinate x) where the histogram is the minimum in the above horizontal range is detected. The horizontal positions are specified as the right and left peripherals of the human.

For example, the value β is determined by computing the pixel quantity corresponding to 40 cm which is slightly wider than the width of general human body.

The vertical range determination module 23d selects a specific length (2 meters for example) for the vertical range of the object. The selection of the range is explained using FIG. 8 (as well as FIG. 1).

FIG. 8 shows that two cameras 2 are installed in a moving robot (which is not shown in FIG. 8) are located in a height H from the floor on which the moving object M stands. The upper schematics and the low schematics in FIG. 8 show the relation of cameras 2 and the moving object M when the tilt angles of the cameras are zero and $\theta_T$ (non-zero), respectively.

Referring to the upper schematics in FIG. 8, the moving object M is apart L from the cameras 2 which has a vertical viewing angle $\theta_v$ and a resolution Y given in the object distance image as denoted a'.

The camera height from the floor is H, the virtual height of the moving object M is 2 meters. The angle $\theta_H$ between the optical axis of the cameras 2 and the line to the virtual top of the moving object (2 meters from the floor) are calculated by eq. (8) as, $$\theta_H = \tan^{-1}((2-H)/L) \qquad (8)$$

where, H and L are given in a unit of meter.

The upper end $y_T$ of the object distance image (a') of the moving object M is given by the following equation.

$$\begin{aligned} y_T &= Y/2 - \theta_H Y/\theta_V \\ &= Y/2 - (Y/\theta_V)\tan^{-1}((2-H)/L) \end{aligned} \qquad (9)$$

The angle $\theta_L$ between the optical axes of the cameras 2 (the each angle for each camera is same each other) and the lower end (on the floor) of the moving object M can be presented in the following equation.

$$\theta_L = \tan^{-1}(H/L) \qquad (10)$$

The lower end $y_B$ of the object distance image (a') of the moving object M is given by the following equation (11).

$$\begin{aligned} y_B &= Y/2 + \theta_L Y/\theta_V \\ &= Y/2 + (Y/\theta_V)\tan^{-1}(H/L) \end{aligned} \qquad (11)$$

The lower schematics in FIG. 8 show the relation of the upper end and the lower end of the moving object when the cameras 2 have a non-zero tilt angle $\theta_T$.

The two cameras 2 have the same viewing angle $\theta_L$ and tilt angle $\theta_T$. It is assumed that the distance from the cameras 2 to the moving object is L, the height of the cameras 2 from the floor H, the assumed height of the moving object M from the floor 2 (meters). The differential angle $(\theta_H - \theta_T)$ can be presented by an angle $\theta_H$ between the optical axes of the cameras 2 and the angle $\theta_T$ between the assumed height of the moving object and the optical axis of the cameras 2 is given in the following equation (12).

$$\theta_H - \theta_L = \tan^{-1}((2-H)/L) \quad (12)$$

The upper end of the object distance image (b') is given by the following equation.

$$y_T = Y/2 - \theta_T Y/\theta_V - (\theta_H - \theta_L)Y/\theta_V \quad (13)$$
$$= Y/2 - \theta_T Y/\theta_V - (Y/\theta_V)\tan^{-1}((2-H)/L)$$

The summation angle ($\theta_L + \theta_T$) of the angle $\theta_L$ between the optical axis of the cameras 2 and the lower end of the moving object (which is the floor) and the tilt angle $\theta_T$ is given by the following equation (14).

$$\theta_L + \theta_T = \tan^{-1}(H/L) \quad (14)$$

The lower end of the moving object in the object distance image (b') is given by the following equation (15).

$$y_B = Y/2 - \theta_T Y/\theta_V + (\theta_L + \theta_T)Y/\theta_V \quad (15)$$
$$= Y/2 - \theta_T Y/\theta_V + (Y/\theta_V)\tan^{-1}(H/L)$$

The vertical range of the object image (a' or b') is determined by the upper end $y_T$ and the bottom end $y_B$.

When the robot which has the cameras 2 makes an ascent or descent of the steps, the robot is not on the same level of the moving object. The level shift or vertical moving is detected by the encoder of the motor driving for such motion. It is possible to determine and specify the vertical position of the moving object M in the object distance image (a' or b') by subtracting or adding the quantity of the level shift or the vertical moving. Another possibility is to determine the height or the level of the floor on which the moving object stands by specifying the position of the moving object on the floor map information stored in the robot beforehand.

The horizontal range of the object image area region can be given in the eq. (16) obtained by the horizontal viewing angle $\theta_h$, the distance L of the object M from the cameras 2 and the horizontal resolution X of the object distance image in a parameter of the horizontal pixel quantity $\alpha_H$ in the object distance image.

$$\alpha H = (X/\theta_h)\tan^{-1}(0.5/L) \quad (16)$$

The contour detector 24 is to detect the contour of the moving object in the range (the object image area) of the moving object image area determination module 23 by using an existing contour technology.

An example of existing contour technologies may be a dynamic contour model called SNAKES. The detection is carried out by deforming and shrinking a closed curve such that the predetermined energy is minimized thereon. A dynamic process such that the energy is computed in the region of moving object (object image are) is adopted and therefore it is possible to reduce the volume of the computation to detect the contour.

Furthermore, the contour detector 24 may include a skin color area determination module 24a.

The skin color determination module 24a is to determine whether the detected contours are those of humans. The determination is carried out by evaluating whether of the skin color area R (see FIG. 3) are included in the detected contours.

The contour detector 24 evaluates and outputs the observation information (the barycenter, moving direction (azimuthal angle), etc.) of the moving object in the contour. The contour detector 24 detects only the humans. When the skin color area determination module 24a determines that the color area within the contour is not that of the human, the contour detector 24 does not output the observation information. As shown in FIG. 9, it is possible to detect the contour O in the object image area T where only one moving object (or only a single person) exists in the object distance image TD.

It is possible to detect humans or moving objects by installing the moving object detection apparatus 1 in moving vehicles such as moving robots, automobiles etc. For example, by applying the present invention to the autonomously moving robots, the robot can detect humans in a crowded area. Furthermore, the present invention can specify each figure of humans. Therefore it is possible to additionally install a face identification process as the post process and then it is possible to chase a particular person or take action for each particular person.

Figure 16:
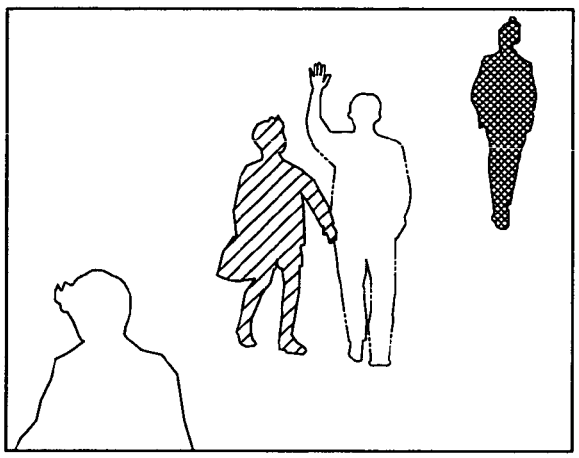
FIG. 16 is a schematic that shows the updated the distance image with the object image area from which the moving object has been removed.

When there are plural moving objects (humans) in the object distance, the extraction of the moving objects are repetitively carried out. The contour detector 24 detects one moving object in the distance image generated by the distance information generator 11 and then eliminates the area from the distance image by setting the pixel values of the pixels included in such area be zeros as shown in FIG. 16. The detection and elimination are repetitively done until all pixel values become zeros.

The structure of the moving object detection apparatus 1 has been explained for an embodiment of the present invention. The moving object detection apparatus 1 can be constructed or organized by a general purpose computer to which a software program is installed to carry out above operation.

The distance information generator 11 in the moving object detection apparatus 1 generates the distance image on the basis of the video images taken by two cameras 2, it is possible to generate the distance image by using more than three cameras. For example, nine cameras 9 arranged in three vertically aligned cameras and three horizontally aligned cameras generate the distance image as the center camera is used as the reference and provides parallaxes given by the relation with the other cameras so that more precise distance to the moving object can be measured.

In the present embodiment, the moving object detection apparatus 1 is configured to detect humans. However it is further possible to apply to detect the general moving object without confining in use for humans by another moving object detection apparatus from which the skin color area image generator 14 and the skin color area determination module 24a may be removed.

(Operation of Moving Object Detection Apparatus 1)

Figure 2B:
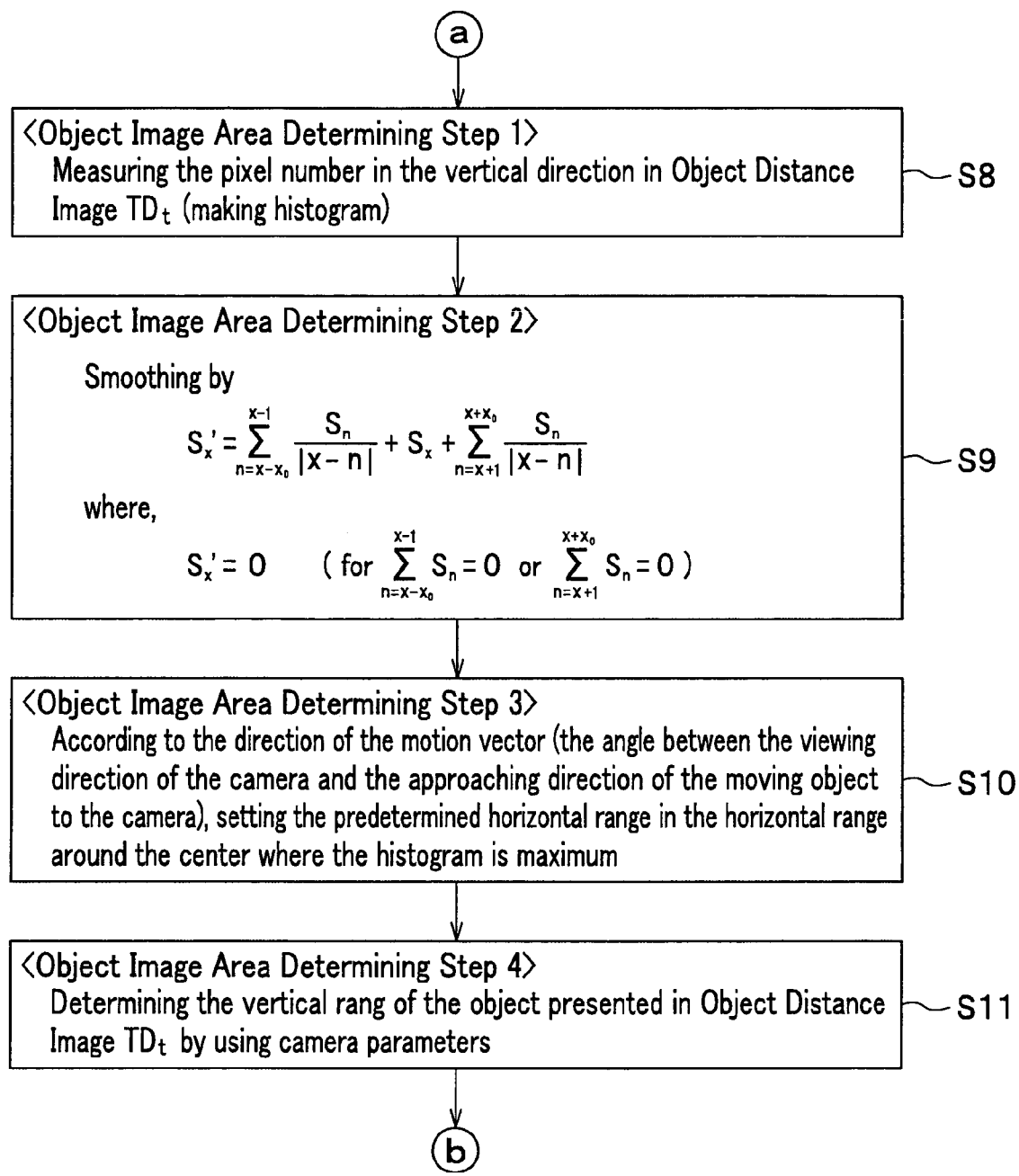
FIG. 2B is a part (the second one of all three parts) of the flow chart that shows the operation of the moving object detection apparatus of the first embodiment.
Figure 2C:
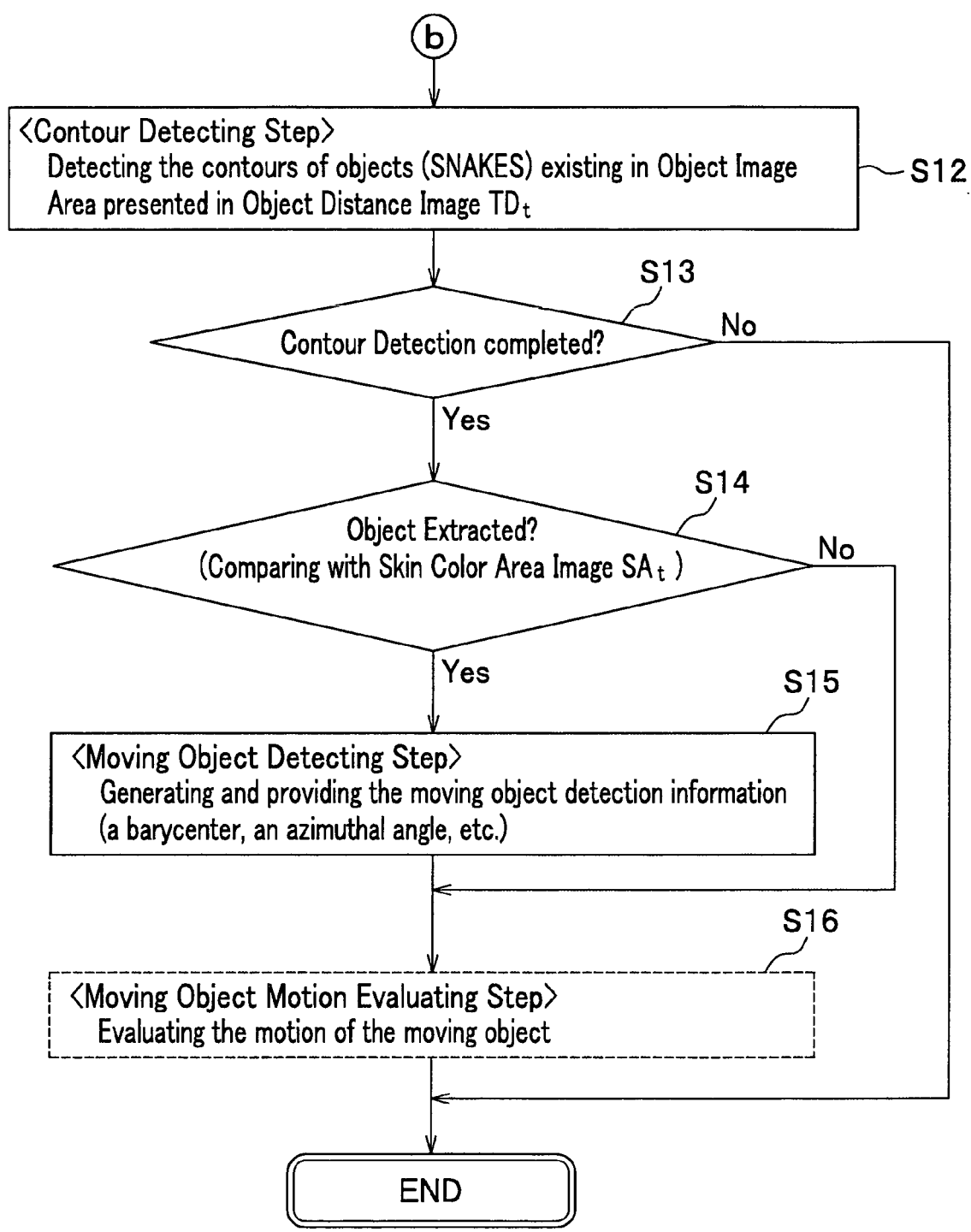
FIG. 2C is a part (the third one of all three parts) of the flow chart that shows the operation of the moving object detection apparatus of the first embodiment.

Referring to flow charts composing of FIG. 2A, FIG. 2B and FIG. 2C as well as FIG. 1, the operation of the moving object detection apparatus is explained.

<Video Image Input Step>

The vide images taken by the two cameras 2 (which are synchronized) are input to the moving object detection apparatus 1 in a time series video frame (the step S1). The extraction of the moving objects are carried out by using the video images (in a unit of frame) taken by the right camera 2a (the reference camera) and the left camera 2b at the time t and other video images taken by these two cameras at the time t+Δt. The system operation is fast enough that the following distance images $D_{t-1}$ and $D_{t-2}$ and the object distance images $TD_{t-1}$ and $TD_{t-1}$ are generated in the time t−1 and the time t−2 are in process while the moving object detection apparatus 1 receives the video image in the time t.

<Distance Image Generating Step>

By means of the distance image generator 11, the moving object detection apparatus 1 generates the distance image $D_t$ which has pixel values representing the parallaxes (distances) by using two video images taken by the right camera 2a (the reference camera) and the left camera 2b at the time t (the step S2).

<Differential Image Generating Step>

By means of the motion information generator 12, the moving object detection apparatus 1 generates the differential image $DI_t$ by differentiating the two video images taken by the right camera 2a (the reference camera) at the time t and t+Δt and set the pixel values be "1" for the pixels which show the differences between these two video images (the step S3).

<Edge Image Generating Step>

By means of the edge image generator 13, the moving object detection apparatus 1 generates the edge image $ED_t$ by using the video image taken by the right camera 2a (the reference camera) (the step S4) at the time t.

<Skin Color Area Image Generating Step>

By means of the skin color area image generator 14, the moving object detection apparatus 1 generates the skin color image $SA_t$ by using the video image taken by the right camera 2a (the reference camera) (the step S5).

<Object Distance Determining Step>

By means of the object distance determination module 21, the moving object detection apparatus 1 determines the distance as the object distance $d_t$ (the distance with a range) in such a way that the object distance 21 makes the image product of the distance image $D_t$ and the differential image $DI_t$, counts the pixels that show the motion in the time difference (the difference between the time t and t+Δt) for every range of parallaxes (distances)and determines the distance for which the maximum-count parallax is obtained (the step S8).

<Object Distance Image Generating Step>

By means of the object distance image generator 22, the moving object determination apparatus 1 generates the object distance image $TD_t$ composed with the pixels presenting the objects in the object distance $d_t$ given in the edge image $ED_t$ (the step S7).

The object distance image generator 22 1 enables to set the depth of the object distance where the object exists in the distance image $D_t$ at the time t.

<Object Image Area Determining Step>

By means of the histogram generator 23a in the object image area determination module 23 installed in the moving object detection apparatus 1, the moving object detection apparatus 1 generates a histogram by counting the pixels in the object distance image $TD_t$ in the vertical direction (the step S8).

According to the experiences to apply this method to various objects, it has been known that it is possible to determine that the center of the horizontal element of the moving object locates at the position where the histogram HI is in the maximum by converting the object distance image TD into a histogram.

By means of the histogram smoother 23b, the moving object detection apparatus 1 smoothes the histogram HI by computing with the algorithms given by eqs. (6) and (7) (the step S9).

As shown in FIG. 6, the histogram sometimes shows a localized peak P1 at the horizontal coordinate (as x-coordinate) to which the hand is projected in case that the moving object raises his or her hand.

In the first embodiment, the histogram smoother 23c smoothes the histogram and modifies it to the histogram HI' as shown in FIG. 7B. By this process, the peak P1 which corresponds to the hand raised by the moving becomes small as P1' and the pixel count around the center of the moving object becomes relatively larger.

A horizontal range is set around the center $x_1$ (as shown in FIG. 7B) where the histogram is maximum (the step S10). It is assumed that the moving object is a human and the angle between the viewing direction of the cameras 2 and the motion vector (due to approaching to the cameras 2 in a deviated angle to the optical axis of the cameras 2) of the human is less than 45 degrees, the range as $x_1 \pm (0.5 \sim 0.6)$ meters is selected as the horizontal range to detect the humans. If the angle between the motion vector and the viewing angle is more than 45 degrees, the range as $x_1 \pm (0.2 \sim 0.3)$ meters is selected as the horizontal range to detect the humans.

The object image area determination module 23 determines the vertical range of the object presented in the object distance image $TD_t$ by using the camera parameters such as the tilt angle and the height from the floor which are given by the cameras 2 (the step S11).

For example, the floor position (actually, the lower end of the object) in the object distance image is obtained from the tilt angle of the cameras 2 and the height from the floor. According to the viewing angle and the distance to the object, the upper end that corresponds to 2 meter height from the floor in such distance is set and specified by the pixel quantity covering the range from the lower end and the upper end. The upper end of the object image area in the object distance image is obtained in a similar way as described above. The upper end of the object in the object distance image may be directly determined by 2 meters position (height from the floor) in the object distance image by the camera tilt angle 2 and the height from the floor. The height 2 meter is an assumed one however another dimensional height is acceptable.

<Contour Detecting Step>

By means of the contour detector 24, the moving object detection apparatus 1 detects the contours of the objects existing in the object image area set in the steps S10 and S11 (the step S12). The object image area is presented in the object distance image $TD_t$ which is generated in the step S7. The dynamic contour model such as SNAKES can be applied to this contour detection regarding the objects in the object image area.

In the subsequent step, it is judged whether the contour detection has been completed or not (the step S13). The judgment does not include only "Yes" or "No" but also includes to specify the reason why the contour detection has not been carried out, such as the object distance is shorter than the predetermined value in the object distance image $TD_t$ or the object image area is smaller than the predetermined one.

When the contour detection is completed ("Yes" in the step S13), the step proceeds to the step S14. When the contour detection has not been carried out ("No" in the step S13), the step proceeds to END.

<Object Extracting Step>

The skin color area determination module 24a included in the contour detector 24 that composes the moving object detection apparatus 1 judges whether the skin color area in the skin color area image $SA_t$ generated in the step S5 is included in the contour detected in the contour detector 24 for the objects and therefore it is possible to determine whether the contour is that of the human or not (the step S14).

When the skin color area determination module 24a determines that the contour of the moving object is that of the human ("Yes" in the step S14), the contour detector 24 generates and outputs the observation information regarding the moving object (the step S15) and the step proceeds to the step S16. The observation information includes the coordinate of the barycenter, the tilt angle of the cameras 2 and angles such as an azimuthal angle, etc. that shows the moving direction of the moving object. When the skin color area determination module determines that the contour of the moving object is not that of the human ("No" in the step S14), the step proceeds to the step S16.

By using the output from the moving object detection apparatus 1 (actually from the contour detector 24) at the step S15, the autonomously moving robot such that the moving object detection apparatus 1 is installed therein can evaluate the motion of the moving object (the step S16) by the assistance of the controller device of the moving robot and the application software to analyze the human action (the step S16).

In the above steps, the moving object detection apparatus 1 in the first embodiment can detect the moving object which is in the video image taken by and sent from the cameras 2. We have discussed the above processes at a moment of the time t and the series of these processes can be repeated in detecting humans by means of the moving apparatus such as a moving robot.

<Second Embodiment>

The second embodiment of the present invention is explained in reference to the figures. The same numbers are selected for the same items as those used in the first embodiment and the duplicated explanations to be used are not repeated in the second embodiment.

The moving object detection apparatus 101 in the second embodiment is different from that of the first embodiment in the configuration that (1) the input image analyzer 110 has no skin color area image generator and (2) the object image area determination module 23 includes a variance detector, symmetry detector and symmetry evaluator.

In the discussion of the second embodiment, the structure of the object image area determination module 23 and the operation of the moving object detection apparatus 101 will be explained in details. The same explanation as that in the first embodiment is not repeated.

The figures and motions of the moving objects are those that an adult is moving in parallel to a child while he is raising his hand.

(Structure of a Moving Object Detector)

Figure 10:
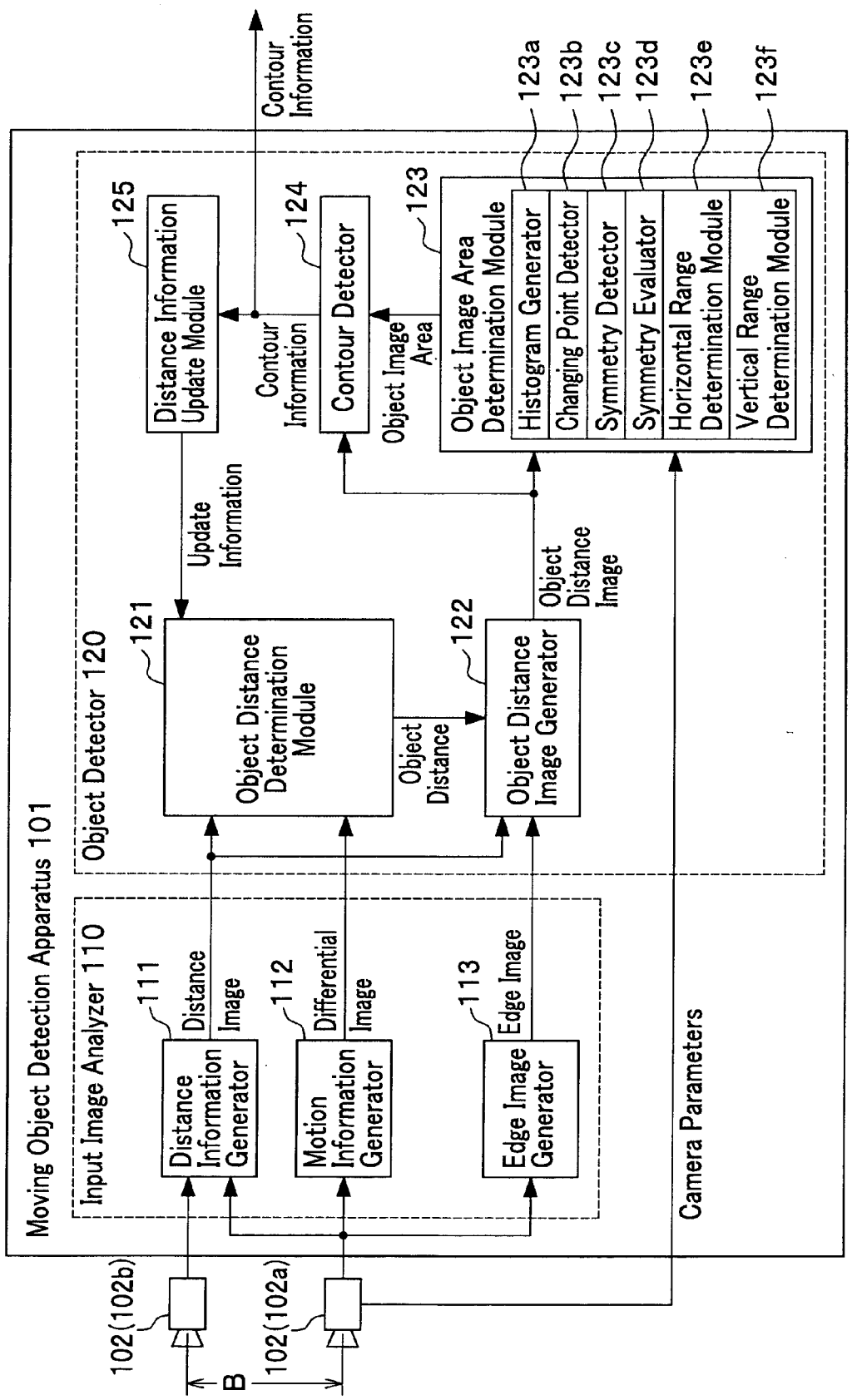
FIG. 10 is a block diagram that shows the whole structure of the functional modules installed in the moving object detection apparatus of the second embodiment.

FIG. 10 shows the block diagram of the moving object detection apparatus 101. The fundamental function of the moving object detection apparatus 101 is to detect the objection which has a motion as we call a moving object by using the video image taken by two cameras 102. In this embodiment, the moving object detection apparatus 101 is constructed with an input image analyzer 110 which analyzes the input video images taken by two cameras 102 and an object detector 120 which detects the object from the analyzed video images. Two cameras 102 as 2a and 2b are horizontally set in a separation length B. One is called a right camera 102a set in relatively right position and the other a left camera 102b set in the relatively left position.

The input image analyzer 110 analyzes the video images taken by the two cameras 2 and synchronously input the input image analyzer 110. As the result of the image analysis, distance images which include the distance information, differential images which include the motion information, edge images which are the edges extracted from the video images. The input image analyzer 110 is constructed by the distance information generator 111, the motion information generator 112 and edge image generator 113.

Since the input image analyzer 110 has the similar structure as the input image analyzer 10 but the skin color area image generator 14 is removed (see FIG. 1), the details of the input image analyzer 110 has been left for the input image analyzer 10 in the first embodiment. No repeated discussion will be held.

The object detector 120 specifies and detects the contours of moving objects through the processes that the image areas corresponding to the moving objects is specified by using the images analyzed and output by the input image analyzer 110 (such as the distance images, differential images and edge images). The object detector 120 is constructed with an object distance measurement module 121, an object distance image generator 122, an object image area detection module 123 and a contour detector 24 and a distance information update module.

Since the object detector 120 is same as the structure as the object detector 20 other than the configuration of the object image area determination module (see FIG. 1), the details of the object image area determination module 123 is to be explained. The other elements will not be discussed.

The object image area determination module 123 determines the area including the moving object (which is called the object image area) by specifying the symmetric vertical lines and determining the most symmetrically vertical line as the horizontal position of the center of the moving object after generating a histogram by counting the pixels in the vertical direction from the original pixels which are in the object distance image (the edge image corresponding to the object distance) generated by the object distance image generator 122. The object image area determination unit 123 includes a histogram generator 123a, a variance detector 123b, a symmetric detector 123c and a symmetric evaluator 123d and horizontal range determination module 123e and vertical range determination module 123f.

The object image area determination module 123 may determine the horizontal range to cover the allowable width of the human figures under an assumption that the moving object is a human. Other than this case, for example, when the human approaches to the cameras 2 in a deviated angle to the optical axis of the cameras 2, the object image area determination module 23 narrows the horizontal range because it may be possible to cover the human figure in such narrow range.

The object image area determination module 123 takes a height (for example 2 meters) of the object image area in vertical direction. For this case, the object image area determination module 123 determines the vertical area (range) of the object image area on the basis of the tilt angle, the height from the floor (installation plane) etc. of the cameras 102.

Figure 12A:
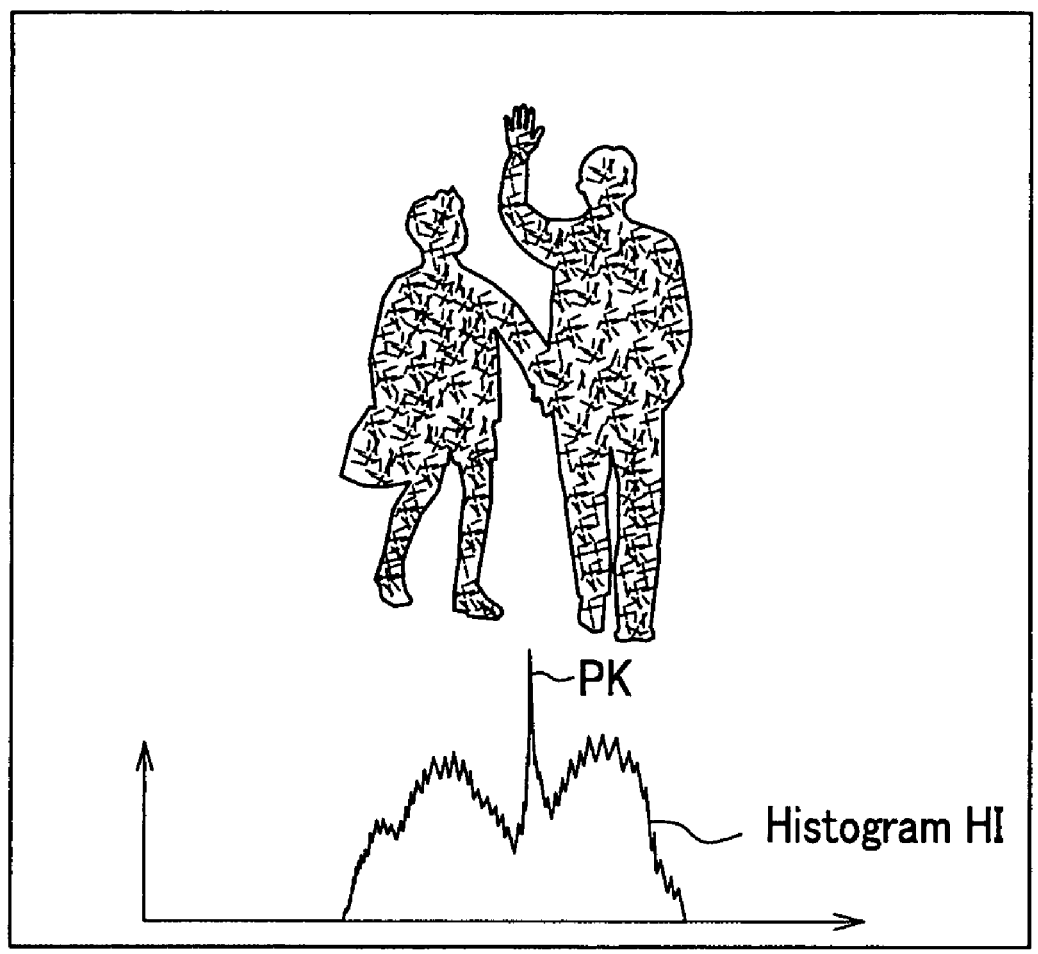
FIG. 12A is a schematic that shows an example of the histogram before smoothing the histogram.
Figure 12B:
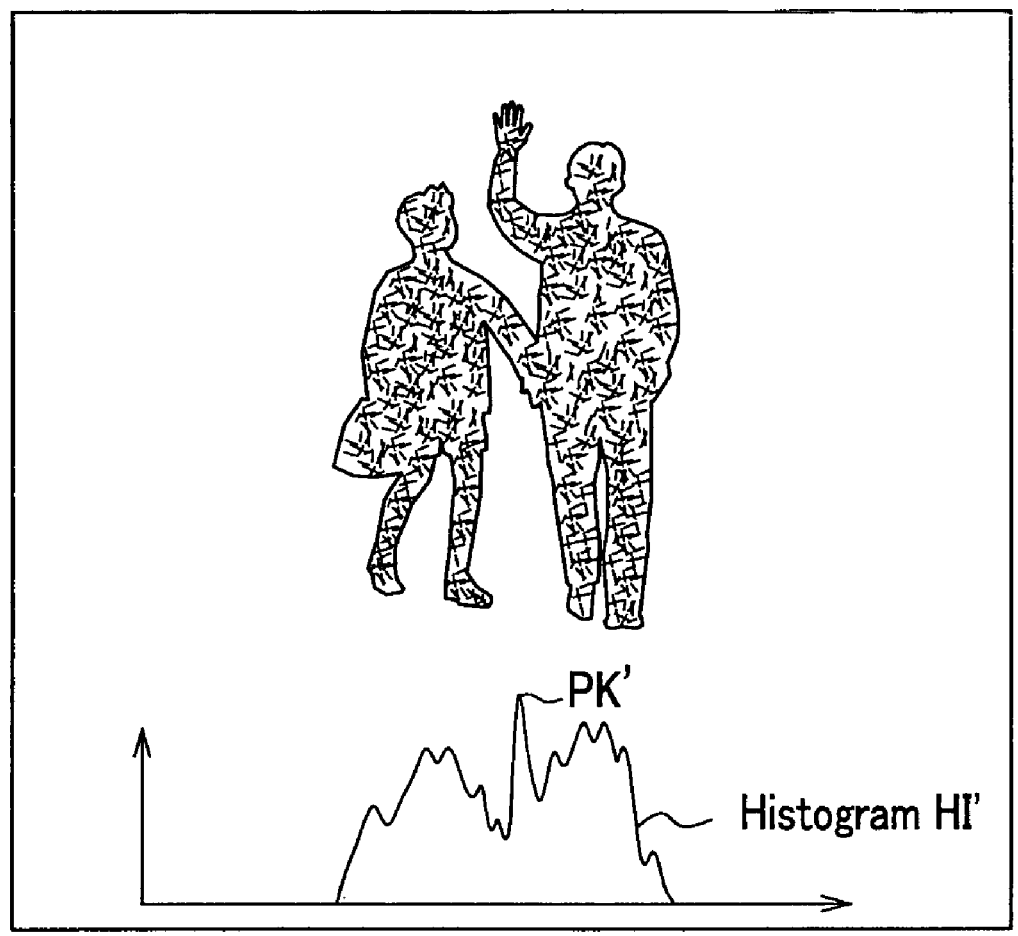
FIG. 12B is a schematic that shows an example of the histogram after smoothing the histogram.
Figure 14:
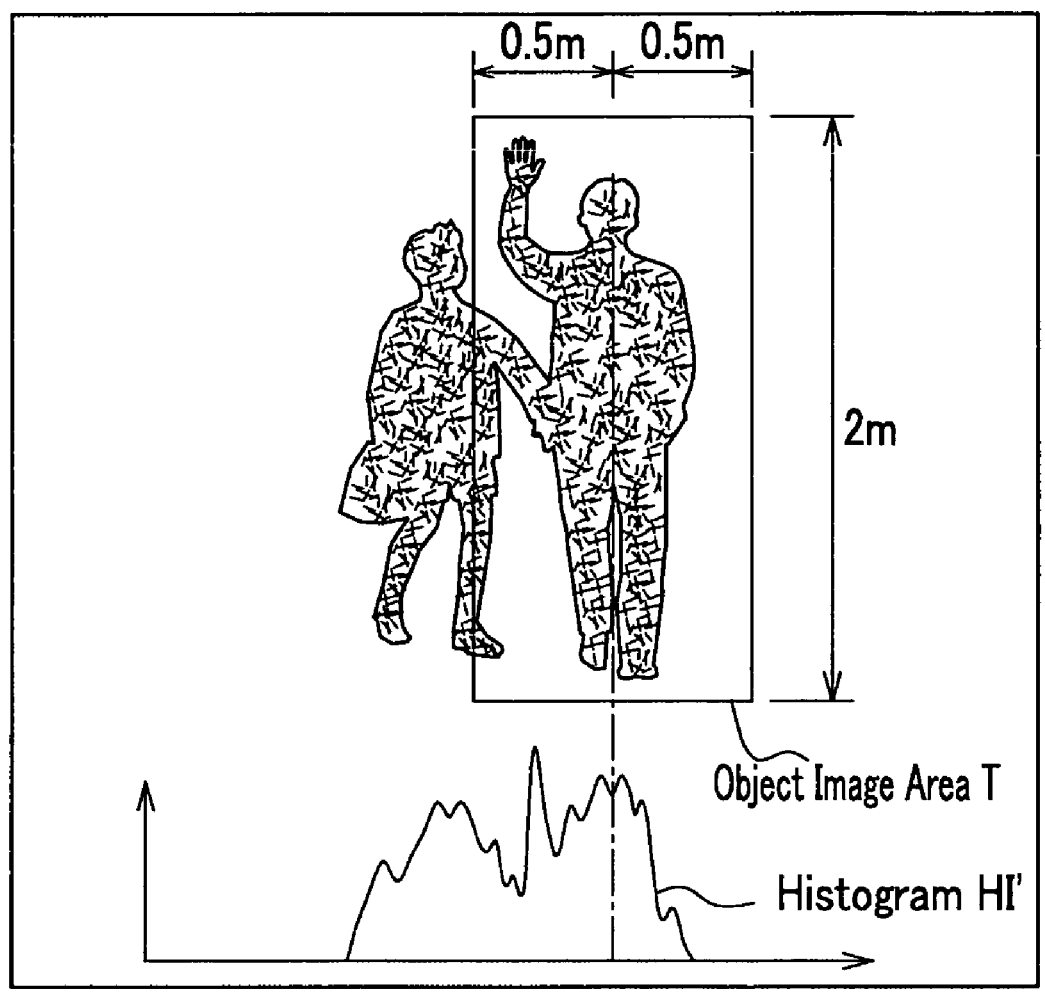
FIG. 14 is a schematic that shows the procedure to compute the height level of the moving object in the object distance image.

Referring to FIG. 12 to FIG. 14, the histogram generator 123a, a changing point detector 123b, a symmetry detector 123c, a symmetric evaluation evaluator 123d, a horizontal range determination module 123e and a vertical range determination module 123f are going to be explained. FIG. 12A and FIG. 12B are histograms HI and smoothed histogram HI' that present the count of the pixel which is the count number of pixels in the vertical direction from the original pixel locating in a horizontally sweeping line in the object distance image generated by the object distance image. FIG. 12A is a histogram HI before smoothing and FIG. 12B another histogram HI' after smoothing. FIG. 13 shows the local maximum and minimum. FIG. 14 shows the object image area specified in the object distance image.

A histogram generator 123a generates a histogram HI that presents the pixel count which is the count of the pixels in a vertical direction in the object distance image TDE generated by the object distance image generator 122.

A histogram smoother 23b in the second embodiment smoothes the histogram HI along the pixel position. More concretely, the histogram is smoothed by using the equations (1) and (2) as the histogram smoother 23b works in the first embodiment.

According to this smoothing process, the histogram HI as shown in FIG. 12A can be converted into the histogram HI' as shown in FIG. 12B. A localized peak PK in the histogram HI is suppressed into a lower peak PK'.

The changing point detector 123b detects the local maximum and the local minimum (sometimes called "a changing point") in the histogram HI'. More concretely, the histogram HI' (which is a moving average of the pixel number in the histogram HI and is given in a continuous curve by means of, for example, a spline interpolation method). One of the method is to compute the increments and decrements of the pixel numbers along the horizontal axis and determines the changing points P1, P2, . . . such that the increments turn to the decrements. The pixel number $S_{xn}'$ and the horizontal coordinate for such pixel number is memorized (not shown in the figures). The method to determine the changing points (the local maxima or minima) is not limited in the above method but another method such that the tangent of the histogram HI' is computed and determines the changing points where the tangents are zero.

The symmetry detector 123c detect the symmetries of the histogram HI' for every three sequential points on the basis of the points $(X_n, S_{xn}')$ for the changing point $P_n$ determined by the changing point detector 123b. The second embodiment specifies the difference DS of the pixel numbers for both ends of the three sequential points (we simply call "pixel number difference DS"). A symmetry parameter is defined by the difference DK of two inclinations (which we simply call the inclination difference DS): one between the center point and one of the neighboring points and the other between the center point and the other neighboring point.

The pixel number difference $DS_n$ is given by eq. (17) as $$DS_n = |S_{Xn+2} - S_{Xn}'|. \tag{17}$$

The inclination difference DKn is given by eq. (18) as $$DK_n = |K_{n+1} - K_n|, \tag{18}$$

where, the inclination is defined by $$Kn = |S_{Xn+1}' - S_{Xn}'|/|X_{n+1} - X_n|. \tag{19}$$

The above equations are explained by using FIG. 13. The symmetry detector 123c first compute the pixel number difference $DS_1$ and the inclination difference $DK_1$ for the three sequential changing points $P_1$, $P_2$, . . . which the changing point detector 123b detects as, $$DS_1 = |S_{X3}' - S_{X1}'| \tag{20a}$$

$$K_1 = |(S_{X2}' - S_{X1}')/(X_2 - X_1)| \tag{20b}$$

$$K_2 = |(S_{X3}' - S_{X2}')/(X_3 - X_2)| \tag{20c}$$

$$DK_1 = |K_2 - K_1| \tag{20d}$$

The symmetry detector 123c computes the pixel number difference $DS_2$ and the inclination difference $DK_2$ for the three sequential changing points $P_2$, $P_3$, . . . which the changing point detector 123b detects as, $$DS_2 = |S_{X4}' - S_{X2}'| \tag{21a}$$

$$K_1 = |(S_{X3}' - S_{X2}')/(X_3 - X_2)| \tag{21b}$$

$$K_2 = |(S_{X4}' - S_3')/(X_4 - X_3)| \tag{21c}$$

$$DK_2 = |K_3 - K_2| \tag{21d}$$

As the symmetry parameter, the symmetry detector 123c computes the pixel number difference $DS_n$ and the inclination difference $DK_n$ for every three sequential changing points $P_n$, $P_{n+1}$ and $P_{n+2}$ (n=1, 2, . . . ). which the changing point detector 123b detects and records in a memory. For the convenience of expression, the center changing point implies the center point of the three sequential changing points. For example, the point $P_{n+1}$ is the center changing point among the three sequential changing points $P_n$, $P_{n+1}$ and $P_{n+2}$.

The symmetry evaluator 123d evaluates the symmetry and determines the most symmetric by using the symmetry parameter. For example, the center changing point where the minimum of the pixel number differences $DS_n$ and the minimum of the inclination differences are obtained is judged to be the most symmetric changing point.

When the center changing point where the pixel number difference is the minimum is different from the center changing point where the inclination difference is the minimum, then the central changing point where the following root mean square is the minimum may be regarded as the most symmetric changing point.

$$L_n = (DS_n^2 + DK_n^2)^{0.5} \tag{22}$$

When the symmetry parameters as $DS_n$ and $DK_n$ are larger than the predetermined value, it may be judged that there is no changing point that shows the symmetry in the smoothed histogram HI'.

The horizontal range determination module 123e, as shown in FIG. 14, specifies the changing point $P_n$ of the horizontal coordinate $X_n$ as the center of the moving object and sets the object image area including the moving object in the object distance image TDE. It is assumed that the human is to be detected and the horizontal range (for example 0.5 meters to 0.6 meters) is set as the existing area of the object in the object image area.

The vertical range determination module 123f sets the existing area of the object based on the camera parameters such as the tilt angle, the height from the floor, etc. It is assumed that the human is to be detected and a certain height (for example 2 meters) is set for the height of the object in the object image area.

The size of the object image area T may be referred to the explanation of the vertical range determination module 23d in the first embodiment as well as FIG. 8 and further detail explanation will not be given.

The contour detector 124 detects the contour of the moving object in the object image area which the object image area determination unit 123 by using a conventional contour determination technology. The determined contour (contour information) is the output from the moving object detection apparatus 101 as well as is sent to the distance information update module 125. By the determination of the contour of the moving object at the contour detector 124, it is concluded that the moving object has been detected.

The distance information update module 125 updates the distance image which has been memorized by a memory device (not shown in the figures) in an object distance determination module 121. For example, the pixel numbers of the distance image which corresponds to the inner area including the contour line are set "0". By this process the object image area is eliminated from the distance image. The distance information update module 125 sends the message that the distance image update has been completed as the update information to object distance determination module 121.

Figure 15:
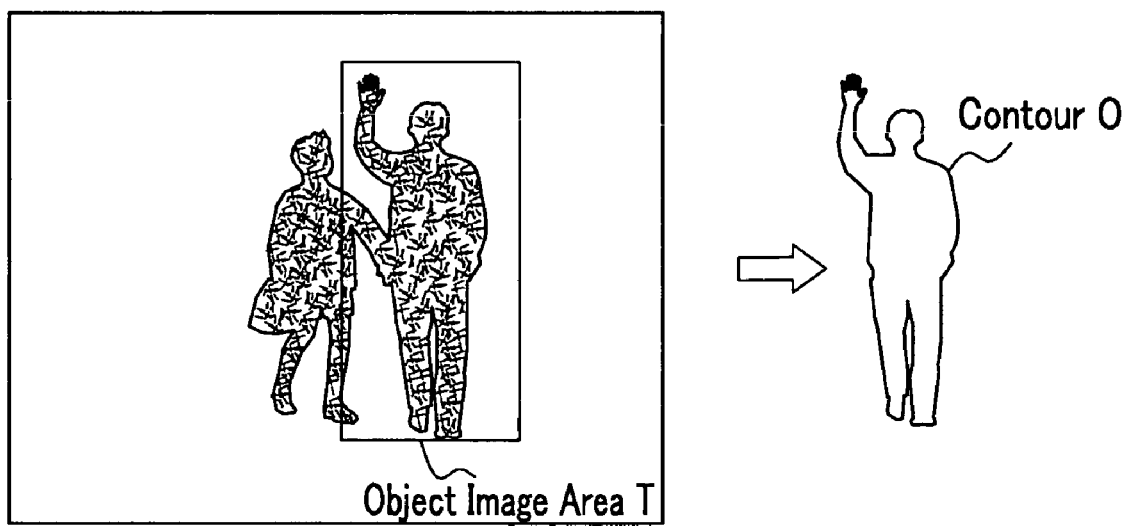
FIG. 15 is a schematic that shows an example to detect the contour of the object image area in the object distance image.

For example, as shown in FIG. 16, the content (that is the distance image pixel values DB given in the distance image D) corresponding to the inner area of the contour O (the inner area including the contour O) detected in the object distance image TDE as shown in FIG. 15 is updated. In other words, all pixel values in the contour O, for example, (30, 50) etc. are set to be "0" for the parallaxes. By such setting of "0" for the parallaxes in the contour O, the moving object detected as the contour O has the infinity distance from the cameras 2 and does not exist in the distance image D any more.

The structure or the moving object detection apparatus 101 in the second embodiment has been explained. The each function modules and functional blocks can be implemented by the computer software modules and it is possible to consolidate these software modules into a moving object detection computer software program.

It may be possible to use cameras more than three for generating the distance image though the distance information generator 111 in the moving object detector 101 generates the distance image on the basis of the video images taken by the two cameras 2. For example, nine cameras arranged three by three in the vertical direction and the horizontal direction determine the distance to the moving object by the parallaxes against the central camera more precisely through the over determinant computation process.

It is possible to detect humans and other moving objects by installing the moving object detection apparatus 101 in moving robots, automobiles or vehicles. For example, the robot equipped with this moving object detection apparatus 101 can detect particular humans in a crowded place. Since the robot can individually specify each human, it may be possible to chase a particular person by identifying his or her face or to perform a specific response to each individual person. These can be done in post processes to the above contour detection process.

An example that the human raises his hand and the contour of such human is determined in the second embodiment. Of cause it is possible to detect the person who does not raise his hand. In such case, it is quickly to detect the contour of the person in the object distance image by means of the symmetry of the histogram.

(Operation of Moving Object Detection Apparatus 101)

Figure 11A:
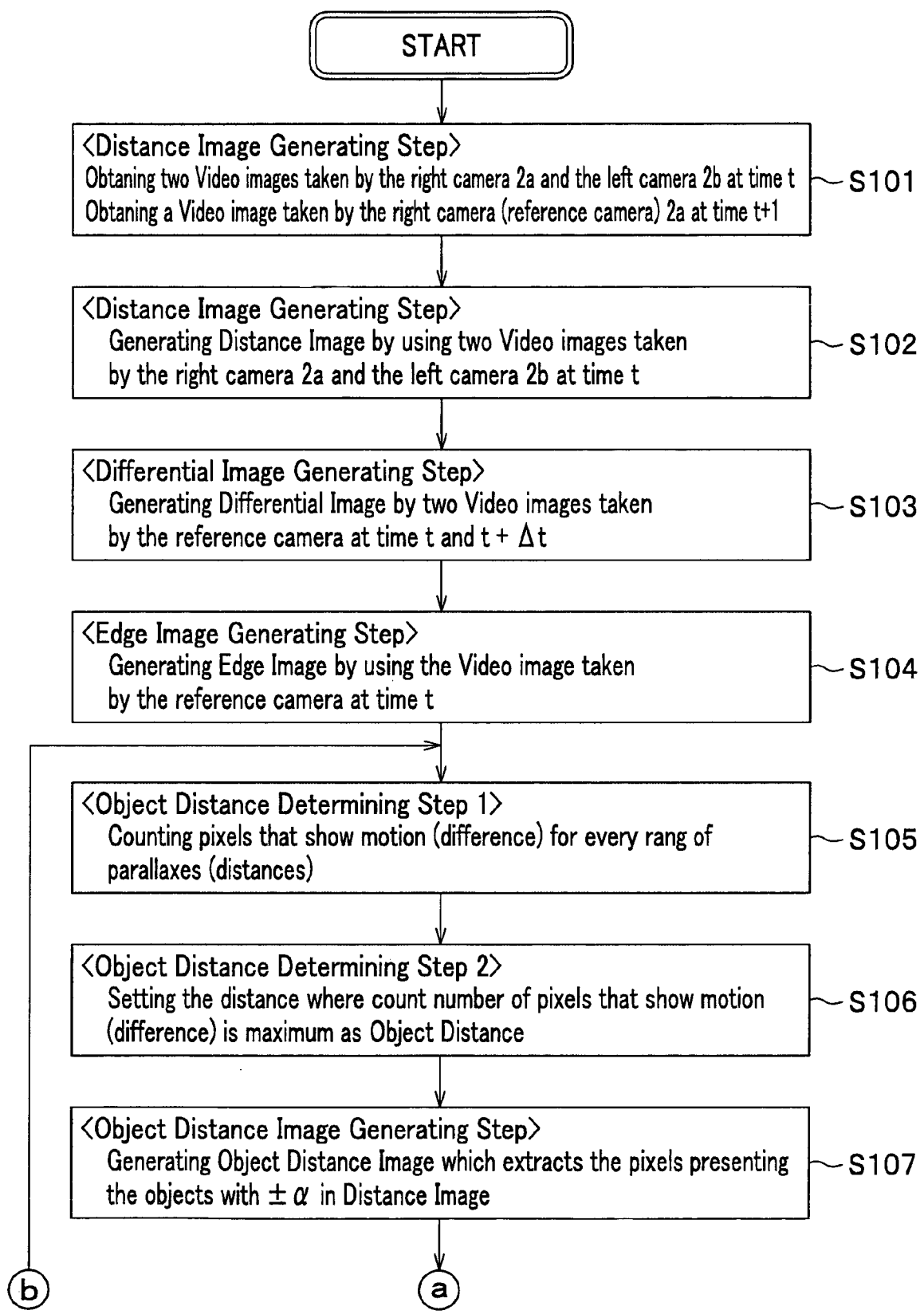
FIG. 11A is the first half of the flow chart that shows the operation of the moving object detection apparatus of the first embodiment.
Figure 11B:
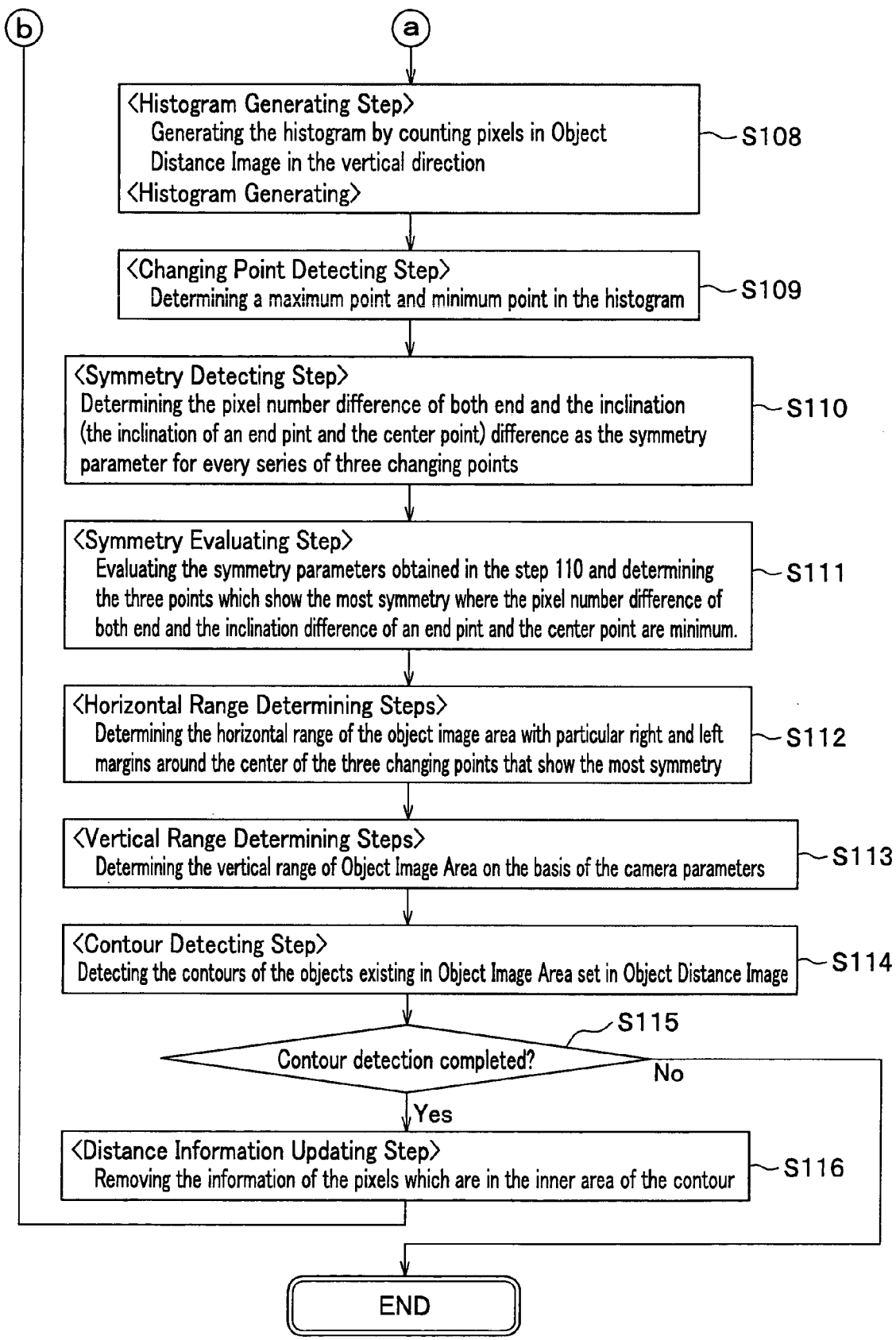
FIG. 11B is the second half of the flow chart that shows the operation of the moving object detection apparatus of the first embodiment.

Referring to flow charts of FIG. 10, FIG. 11A and FIG. 11B, the operation of the moving object detection apparatus 101 is explained. FIG. 11A and FIG. 11B are the flow charts showing the operation of the moving object detection apparatus 101.

<Video Image Input Step>

The vide images taken by the two cameras 2 (which are synchronized) are input to the moving object detection apparatus 101 in a time series video frame (the step S101). The detection of the contour of the moving objects is carried out by using the video images (in a unit of frame) taken by the right camera 2a (the reference camera) and the left camera 2b at the time t and those by these two cameras at the time t+1 (such as one frame after the time t).

<Distance Image Generating Step>

The distance image generator 111 in the moving object detection apparatus 101 generates the distance image which has pixel values representing the parallaxes (distances) by using two video images taken by the right camera 2a (the reference camera) and the left camera 2b at the time t (the step S102).

<Motion Information Generating Step>

The motion information generator 112 in the moving object detection apparatus 101 generates a differential image by differentiating the two video images taken by the right camera 2a (the reference camera) at the time t and t+Δt and set the pixel values be "1" for the pixels which show the differences (motions) between these two video images and "0" for the pixels which show no differences (the step S103).

<Edge Image Generating Step>

The edge image generator 113 in the moving object detection apparatus 101 generates the edge image by using the video image taken by the right camera 2a (the reference camera) at the time t (the step S104).

<Object Distance Determining Step>

The object distance determination module 121 in the moving object detection apparatus 101 counts the pixels that show the motion for every range of parallaxes (which is the distances) (the step S105) given in the distance image by using the distance image and the differential image generated in the steps S102 and S103, respectively. For example, the object distance determination module 121 counts the pixel values of the pixels in the differential image that corresponds to the pixels in a certain parallax (distance) in the distance image. The distance where the count number of the pixels that show the motion is the maximum is determined and set as the object distance of the moving object (the step S106).

<Object Distance Image Generating Step>

The object distance image generator 122 in the moving object determination apparatus 101 generates the object distance image which extracts the pixels presenting the objects with ±α in the distance image (the step S107). The value of α is set to be several tens centimeters.

<Histogram Generating Step>

The histogram generator 123a in the moving object determination apparatus 101 generates the histogram by counting the pixels in the object distance image in the vertical direction (the step S108). The histogram generator 123a smoothes the generated histogram.

<Changing Point Detecting Step>

The changing point detector 123b in the moving object determination apparatus 101 determines the changing points (the local maxima and minima) in the histogram generated in the step S8 (the step S108). For example, the pixel number ($S_{Xn}'$) in the horizontal direction ($X_n$) is compared with the neighboring pixel numbers. When the pixel number increases and then turns to decrease, the point is determined as a maximum and the horizontal position Xn and the pixel number $S_{Xn}'$ are memorized. The minimum point is determined in a similar method.

<Symmetry Detecting Step>

By means of the symmetry detector 123c, the moving object detection apparatus 101 determines the pixel number difference $DS_n$ and the inclination difference $DK_n$ as the symmetry parameter for every series of three changing points $P_n$, $P_{n+1}$ and $P_{n+2}$ (the step S110) regarding the coordinates ($X_n$, $S_{Xn}'$) of the changing points $P_n$ (the local maximum and minimum) (the step S110).

<Symmetry Evaluating Step>

By means of the symmetry evaluator 123d, the moving object detector 101 evaluates the symmetry parameters obtained in the step 110 and determined the three points which show the most symmetry in the histogram HI' (the step S110).

<Horizontal and Vertical Range Determining Steps>

By means of the horizontal range determination module, the moving object detection apparatus 101 determines the horizontal range of the object image area with particular right and left margins (for example, 0.5 to 0.6 meters) around the center of the three changing points that show the most symmetry (the step S112).

By means of the vertical range determination module 123f, the moving object detection apparatus 101 determines the vertical range of the object image area on the basis of the camera parameters, such as the tilt angle, the camera height from the floor (setting level), with particular right and left margins (for example, 0.5 to 0.6 meters) around the center of the three changing points that show the most symmetry (the step S112). The steps from the histogram generation step to the horizontal and vertical rang determining step correspond to the object image area determining step.

For example, the floor position (the lower end of the object) in the object distance image is obtained from the tilt angle of the cameras 2 and the height from the floor. According to the viewing angle and the distance to the object, the upper end that corresponds to the height of 2 meters from the floor in such distance is set and specified by the pixel number covering the range from the lower end and the upper end. The upper end of the object image area in the object distance image is obtained in a similar way as described above. The upper end of the object in the object distance image may be directly determined by 2 meters position (height from the floor) in the object distance image by the camera tilt angle 2 and the height from the floor. The height of 2 meters is an assumed one however another dimensional height is acceptable.

<Contour Detecting Step>

By means of the contour detector 124, the moving object detection apparatus 101 detects the contours of the objects existing in the object image area set in the steps S112 and S113 (the step S114). For example, the edge of the object image area is detected and detecting the contour by applying the dynamic contour model (SNAKES).

The completion of the contour detection is subsequently judged (the step S115). The judgment includes not only "Yes" or "No" but also the specific reason why the contour detection has not been carried out, such as the object distance is shorter than the predetermined value in the object distance image $TD_t$ or the object image area is smaller than the predetermined one.

The contour detection is completed ("Yes" in the step S114), the step proceeds to the step S116. When the contour detection has not been carried out ("No" in the step S13), the step proceeds to END.

<Distance Information Updating Step>

By means of the distance information update module 125, the moving object detection apparatus 101 updates the distance image corresponding to the inner area (the inner area including the contour) of the contour detected by the step S114 (the step S116). For example the pixel values of the pixels in the distance image of which pixels correspond to the inner area of the contour are set to be "0". Then the image area of the moving objects is removed from the distance image after detection as mentioned above. The step proceeds to the step S105 and continues processing.

According to all above steps, the moving object detection apparatus 101 in the second embodiment can detect the object of which image is taken in the video images taken by the cameras 2. We have discussed above processes including the detection of the contour of the moving object at a moment of the time t and the series of these processes can be repeated in detecting humans by means of the moving apparatus such as a moving robot.

What is claimed is:

1. A moving object detection apparatus that detects moving objects by means of plural video images, including image acquisition objects, taken by plural synchronized cameras, comprising:

a distance information generating means that generates distance information regarding distance to said image acquisition objects on a basis of parallax of said cameras, a motion information generating means that generates motion information regarding motion of said moving objects on a basis of differences between video images input in time-series by one of said cameras, an object distance determining means that determines object distance which specifies a location where said moving object locates, an object distance image generating means that generates a object distance image composed with pixels which correspond to said object distance determined by said object distance determining means, an object image area determining means that determines an object image area, included in said object distance image, corresponding to at least said object distance, and a contour detecting means that detects said moving object by detecting contour in said object image area determined by said object image area determining means, wherein said object image area determining means determines a histogram by counting said pixels in vertical direction for every point in a horizontal coordinate thereof, makes a smoothed histogram by smoothing said histogram in said horizontal coordinate and determines an object image area by using said smoothed histogram thereafter.

2. A moving object detection apparatus according to claim 1 further comprising an edge image generating means that generates edge image by detecting edges of said image acquisition object included in said video image on a basis color information and color concentration information given in each of pixels composing said video image, wherein said object distance image generating means generates said object distance image by extracting pixels, which correspond to object distances set by said object distance determining means, in said edge image.

3. A moving object detection apparatus according to claim 1,
wherein said object distance image generating means generates said object distance image by extracting pixels, which correspond to object distances set by said object distance determining means, in said video image.

4. A moving object detection apparatus according to claim 1,
wherein said object distance image generating means generates said object distance image by extracting pixels, which correspond to object distances set by said object distance determining means, in said distance image.

5. A moving object detection apparatus according to claim 1,
wherein said object image area determining means makes said smoothed histogram by computing with following equation:

$$S'_x = \sum_{n=x-x_0}^{x-1} \frac{S_n}{f(n)} + S_x + \sum_{n=x+1}^{x+x_0} \frac{S_n}{f(n)},$$

where, $S_x$ is a pixel number in a horizontal coordinate x of said histogram and $S'_x$ is a pixel number at a horizontal coordinate x of said smoothed histogram, x0 is a positive constant and $f(n)$ is a function of n or a constant.

6. A moving object detection apparatus according to claim 5,
wherein said object image area determining means makes said smoothed histogram by computing said equation with a condition: $f(n)=|x-n|$.

7. A moving object detection apparatus according to claim 5,
wherein further condition as described below is used.

$$S'_x = 0 \left( \text{for } \sum_{n=x-x_0}^{x-1} S_n = 0 \text{ or } \sum_{n=x+1}^{x+x_0} S_n = 0 \right).$$

8. A moving object detection apparatus according to claim 1,
wherein said object image area determining means sets a horizontal range around said x-coordinate where pixel number is maximum in said histogram as a predetermined horizontal range.

9. A moving object detection apparatus according claim 1,
wherein said object image area determining means determines a vertical area of said object image area on a basis of at least a tilt angle and a height from a floor on which said cameras are set.

10. A moving object detection apparatus according to claim 1,
wherein said object image area determining means evaluates symmetry of said smoothed histogram and determines said object image area on a basis of most symmetry point in said smoothed histogram.

11. A moving object detection apparatus according to claim 10, wherein said object distance determining means counts such pixels that show motion for every rang of distances and determines object distance where said moving object locates on a basis of count of said pixels thereafter.

12. A moving object detection apparatus according to claim 10,
wherein said object distance image generating means generates an object distance image composed with pixels that present said image acquisition objects existing in a predetermined range in depth direction on the basis of said object distance.

13. A moving object detection apparatus according to claim 10,
wherein object image area determining means detects local maxima and minima in said histogram, determines pixel number difference in vertical direction of every three series points and inclination difference of two lines provided by a center point and other two points of said three series points and determines a center point of three series points, of which center point provides a minimum pixel number difference and a minimum inclination difference as most symmetry point in said smoothed histogram.

14. A moving object detection apparatus according to claim 13,
wherein object image area determining means determines a horizontal range of said object image area with a particular margin around said most symmetry point.

15. A moving object detection method that detects moving objects by means of plural video images, including image acquisition objects, taken by plural synchronized cameras, comprising: the steps of generating distance information regarding distance to said image acquisition objects on a basis of parallax of said cameras;

generating motion information regarding motion of said moving objects on a basis of differences between video images input in time-series by one of said cameras;

determining object distance which specifies a location where said moving object locates;

generating object distance image composed with pixels which correspond to said object distance determined by said step of determining said object distance;

determining an image area, included in said object distance image, corresponding to at least said object distance; and detecting said moving object by detecting contour in said object image area determined by said step of determining said image, wherein said step of determining said image area further functions to determine histogram by counting said pixels in vertical direction for every horizontal coordinate points thereof, make a smoothed histogram by smoothing said histogram in said horizontal coordinate and determine an object image area by using said smoothed histogram thereafter.

16. A moving object detection method according to claim 15,
wherein said step of determining said image area further functions to determine said image area on a basis of most symmetry point in said smoothed histogram by evaluating symmetry of said smoothed histogram.

17. A moving object detection program, embodied on a computer readable medium, that has a function to detect moving objects by means of plural video images, including image acquisition objects, taken by plural synchronized cameras, comprising:
- a distance information generating subprogram that generates distance information regarding distance to said image acquisition objects on a basis of parallax of said cameras,
- a motion information generating subprogram that generates motion information regarding motion of said moving objects on a basis of differences between video images input in time-series by one of said cameras,
- an object distance determining subprogram that determines object distance which specifies a location where said moving object locates,
- an object distance image generating subprogram that generates an object distance image composed with pixels which correspond to said object distance determined by said object distance determining subprogram,
- an object image area determining subprogram that determines an object image area, included in said object distance image, corresponding to at least said object distance, and
- a contour detecting subprogram that detects said moving object by detecting contour in said object image area determined by said object image area determining subprogram, wherein said object image area determining subprogram determines a histogram by counting said pixels in vertical direction for every point in a horizontal coordinate thereof, makes a smoothed histogram by smoothing said histogram in said horizontal coordinate and determines an object image area by using said smoothed histogram thereafter.

18. A moving object detection program according to claim 17, wherein said object image area determining subprogram determines said image area on a basis of a most symmetry point in said smoothed histogram by evaluating symmetry of said smoothed histogram.

* * * * *